(12) United States Patent  
Jones et al.

(10) Patent No.: US 8,909,851 B2  
(45) Date of Patent: Dec. 9, 2014

(54) STORAGE CONTROL SYSTEM WITH CHANGE LOGGING MECHANISM AND METHOD OF OPERATION THEREOF

(75) Inventors: Ryan Jones, Mesa, AZ (US); Robert W. Ellis, Phoenix, AZ (US); Joseph Taylor, Gilbert, AZ (US)

(73) Assignee: Smart Storage Systems, Inc., Milpitas, CA (US)

( * ) Notice: Subject to any disclaimer, the term of this patent is extended or adjusted under 35 U.S.C. 154(b) by 118 days.

(21) Appl. No.: 13/369,195

(22) Filed: Feb. 8, 2012

(65) Prior Publication Data

US 2012/0203958 A1 Aug. 9, 2012

Related U.S. Application Data

(60) Provisional application No. 61/440,400, filed on Feb. 8, 2011.

(51) Int. Cl.
*G06F 12/02* (2006.01)

(52) U.S. Cl.
CPC .... *G06F 12/0246* (2013.01); *G06F 2212/7207* (2013.01); *G06F 2212/7201* (2013.01)
USPC ........... 711/103; 711/202; 711/205; 711/206; 711/207

(58) Field of Classification Search
CPC .................... G06F 12/0246; G06F 2212/7201; G06F 2212/7207
USPC .......................... 711/103, 202, 205, 206, 207
See application file for complete search history.

(56) References Cited

U.S. PATENT DOCUMENTS

| | | |
|---|---|---|
| 4,048,481 A | 9/1977 | Bailey, Jr. et al. |
| 5,311,395 A | 5/1994 | McGaha et al. |
| 5,479,638 A | 12/1995 | Assar et al. |
| 5,930,504 A | 7/1999 | Gabel |
| 5,949,785 A | 9/1999 | Beasley |
| 5,963,983 A | 10/1999 | Sakakura et al. |
| 6,091,652 A | 7/2000 | Haehn et al. |
| 6,275,436 B1 | 8/2001 | Tobita et al. |
| 6,345,367 B1 | 2/2002 | Sinclair |
| 6,356,447 B2 | 3/2002 | Scafidi |
| 6,381,670 B1 | 4/2002 | Lee et al. |

(Continued)

FOREIGN PATENT DOCUMENTS

EP 1 990 921 A2 11/2008

OTHER PUBLICATIONS

IBM Corporation, Systems Management Contrilling System Shutdown Using a Power-Handling Program, Version 5, Release 4, 9th Edition, pp. 1-21, Feb. 2006.

(Continued)

*Primary Examiner* — Reginald G. Bragdon
*Assistant Examiner* — Mehdi Namazi
(74) *Attorney, Agent, or Firm* — Morgan, Lewis & Bockius LLP

(57) ABSTRACT

A method of operation of a storage control system including: providing a memory controller; accessing a volatile memory table by the memory controller; writing a non-volatile semiconductor memory for persisting changes in the volatile memory table; and restoring a logical-to-physical table in the volatile memory table, after a power cycle, by restoring a random access memory with a logical-to-physical partition from a most recently used list.

10 Claims, 16 Drawing Sheets

(56) References Cited

U.S. PATENT DOCUMENTS

| | | | |
|---|---|---|---|
| 6,412,080 B1 | 6/2002 | Fleming et al. | |
| 6,552,581 B1 | 4/2003 | Gabara | |
| 6,587,915 B1 | 7/2003 | Kim | |
| 6,618,249 B2 | 9/2003 | Fairchild | |
| 6,728,913 B1 | 4/2004 | Parker | |
| 6,763,424 B2 | 7/2004 | Conley | |
| 6,775,792 B2 | 8/2004 | Ulrich et al. | |
| 6,778,387 B2 | 8/2004 | Fairchild | |
| 6,850,443 B2 | 2/2005 | Lofgren et al. | |
| 6,854,070 B2 | 2/2005 | Johnson et al. | |
| 6,903,972 B2 | 6/2005 | Lasser et al. | |
| 6,906,961 B2 | 6/2005 | Eggleston et al. | |
| 6,975,028 B1 | 12/2005 | Wayburn et al. | |
| 7,082,495 B2 | 7/2006 | DeWhitt et al. | |
| 7,107,389 B2 | 9/2006 | Inagaki et al. | |
| 7,139,864 B2 | 11/2006 | Bennett et al. | |
| 7,233,497 B2 | 6/2007 | Simon et al. | |
| 7,243,186 B2 | 7/2007 | Liang et al. | |
| 7,330,927 B1 | 2/2008 | Reeve et al. | |
| 7,333,364 B2 | 2/2008 | Yu et al. | |
| 7,355,896 B2 | 4/2008 | Li et al. | |
| 7,434,122 B2 | 10/2008 | Jo | |
| 7,441,067 B2 | 10/2008 | Gorobets et al. | |
| 7,516,267 B2 * | 4/2009 | Coulson et al. | 711/103 |
| 7,613,871 B2 | 11/2009 | Tanaka et al. | |
| 7,620,769 B2 | 11/2009 | Lee et al. | |
| 7,639,532 B2 | 12/2009 | Roohparvar et al. | |
| 7,661,054 B2 | 2/2010 | Huffman et al. | |
| 7,679,948 B2 | 3/2010 | Park et al. | |
| 7,738,502 B2 | 6/2010 | Chang et al. | |
| 7,743,216 B2 | 6/2010 | Lubbers et al. | |
| 7,818,525 B1 | 10/2010 | Frost et al. | |
| 7,827,348 B2 | 11/2010 | Lee et al. | |
| 7,830,164 B2 | 11/2010 | Earle et al. | |
| 7,979,614 B1 | 7/2011 | Yang | |
| 8,001,135 B2 | 8/2011 | Perlmutter et al. | |
| 8,010,738 B1 | 8/2011 | Chilton et al. | |
| 8,028,123 B2 | 9/2011 | Kilzer et al. | |
| 8,046,645 B2 | 10/2011 | Hsu et al. | |
| 8,051,241 B2 | 11/2011 | Feldman et al. | |
| 8,072,805 B2 | 12/2011 | Chou et al. | |
| 8,095,724 B2 | 1/2012 | Ji et al. | |
| 8,095,765 B2 | 1/2012 | Asnaashari et al. | |
| 8,117,396 B1 | 2/2012 | Fair et al. | |
| 8,127,202 B2 | 2/2012 | Cornwell et al. | |
| 8,145,984 B2 | 3/2012 | Sommer et al. | |
| 8,154,921 B2 | 4/2012 | Mokhlesi et al. | |
| 8,169,825 B1 | 5/2012 | Shalvi et al. | |
| 8,219,724 B1 | 7/2012 | Caruso et al. | |
| 8,219,776 B2 | 7/2012 | Forhan et al. | |
| 8,228,701 B2 | 7/2012 | Sokolov et al. | |
| 8,245,101 B2 | 8/2012 | Olbrich et al. | |
| 8,254,172 B1 | 8/2012 | Kan | |
| 8,259,506 B1 | 9/2012 | Sommer et al. | |
| 8,289,801 B2 | 10/2012 | Smith et al. | |
| 8,332,578 B2 | 12/2012 | Frickey, III et al. | |
| 8,363,413 B2 | 1/2013 | Paquette et al. | |
| 8,369,141 B2 | 2/2013 | Sommer et al. | |
| 8,386,700 B2 | 2/2013 | Olbrich et al. | |
| 8,407,409 B2 | 3/2013 | Kawaguchi | |
| 8,464,106 B2 | 6/2013 | Filor et al. | |
| 8,612,804 B1 | 12/2013 | Kang et al. | |
| 2002/0159285 A1 | 10/2002 | Morley et al. | |
| 2003/0046603 A1 | 3/2003 | Harari et al. | |
| 2003/0074592 A1 | 4/2003 | Hasegawa | |
| 2003/0163633 A1 | 8/2003 | Aasheim et al. | |
| 2004/0080985 A1 | 4/2004 | Chang et al. | |
| 2004/0252670 A1 | 12/2004 | Rong et al. | |
| 2005/0021904 A1 | 1/2005 | Iaculo et al. | |
| 2005/0038792 A1 | 2/2005 | Johnson | |
| 2005/0073884 A1 | 4/2005 | Gonzalez et al. | |
| 2006/0020745 A1 | 1/2006 | Conley et al. | |
| 2006/0136682 A1 | 6/2006 | Haridas et al. | |
| 2006/0143365 A1 | 6/2006 | Kikuchi | |
| 2006/0253641 A1 | 11/2006 | Gatzemeier et al. | |
| 2006/0256624 A1 | 11/2006 | Eggleston et al. | |
| 2006/0282644 A1 | 12/2006 | Wong | |
| 2006/0294574 A1 | 12/2006 | Cha | |
| 2007/0061511 A1 | 3/2007 | Faber | |
| 2007/0083779 A1 | 4/2007 | Misaka et al. | |
| 2007/0234004 A1 | 10/2007 | Oshima et al. | |
| 2007/0260811 A1 | 11/2007 | Merry, Jr. et al. | |
| 2007/0263444 A1 | 11/2007 | Gorobets et al. | |
| 2007/0276973 A1 | 11/2007 | Tan et al. | |
| 2008/0046630 A1 | 2/2008 | Lasser | |
| 2008/0052446 A1 | 2/2008 | Lasser et al. | |
| 2008/0082736 A1 | 4/2008 | Chow et al. | |
| 2008/0183918 A1 | 7/2008 | Dhokia et al. | |
| 2008/0313505 A1 | 12/2008 | Lee et al. | |
| 2009/0019321 A1 | 1/2009 | Radke | |
| 2009/0089485 A1 | 4/2009 | Yeh | |
| 2009/0138654 A1 | 5/2009 | Sutardja | |
| 2009/0157948 A1 | 6/2009 | Trichina et al. | |
| 2009/0164702 A1 | 6/2009 | Kern | |
| 2009/0172262 A1 | 7/2009 | Olbrich et al. | |
| 2009/0228761 A1 | 9/2009 | Perlmutter et al. | |
| 2009/0259819 A1 | 10/2009 | Chen et al. | |
| 2009/0259896 A1 | 10/2009 | Hsu et al. | |
| 2009/0323419 A1 | 12/2009 | Lee et al. | |
| 2009/0327581 A1 | 12/2009 | Coulson | |
| 2009/0327591 A1 | 12/2009 | Moshayedi | |
| 2010/0017650 A1 | 1/2010 | Chin et al. | |
| 2010/0023674 A1 | 1/2010 | Aviles | |
| 2010/0050053 A1 | 2/2010 | Wilson et al. | |
| 2010/0138592 A1 * | 6/2010 | Cheon | 711/103 |
| 2010/0169541 A1 | 7/2010 | Freikorn | |
| 2010/0174845 A1 | 7/2010 | Gorobets et al. | |
| 2010/0217915 A1 | 8/2010 | O'Connor et al. | |
| 2010/0262792 A1 | 10/2010 | Hetzler et al. | |
| 2010/0262795 A1 | 10/2010 | Hetzler et al. | |
| 2010/0262875 A1 | 10/2010 | Hetzler et al. | |
| 2010/0287328 A1 | 11/2010 | Feldman et al. | |
| 2010/0293367 A1 | 11/2010 | Berke et al. | |
| 2010/0312954 A1 | 12/2010 | Jeon et al. | |
| 2010/0318719 A1 | 12/2010 | Keays et al. | |
| 2010/0332726 A1 | 12/2010 | Wang | |
| 2011/0055468 A1 | 3/2011 | Gonzalez et al. | |
| 2011/0066788 A1 | 3/2011 | Eleftheriou et al. | |
| 2011/0131365 A1 * | 6/2011 | Zhang et al. | 711/103 |
| 2011/0131447 A1 | 6/2011 | Prakash et al. | |
| 2011/0145473 A1 | 6/2011 | Maheshwari | |
| 2011/0190963 A1 | 8/2011 | Glassl et al. | |
| 2011/0191522 A1 | 8/2011 | Condict et al. | |
| 2011/0191649 A1 | 8/2011 | Lim et al. | |
| 2011/0238892 A1 | 9/2011 | Tsai et al. | |
| 2011/0320687 A1 | 12/2011 | Belluomini et al. | |
| 2012/0047320 A1 | 2/2012 | Yoo et al. | |
| 2012/0047409 A1 | 2/2012 | Post et al. | |
| 2012/0124046 A1 | 5/2012 | Provenzano | |
| 2012/0124273 A1 | 5/2012 | Goss et al. | |
| 2012/0151260 A1 | 6/2012 | Zimmermann et al. | |
| 2012/0216085 A1 | 8/2012 | Weingarten et al. | |
| 2012/0239858 A1 | 9/2012 | Melik-Martirosian | |
| 2012/0266048 A1 | 10/2012 | Chung et al. | |
| 2012/0331207 A1 | 12/2012 | Lassa et al. | |
| 2013/0007380 A1 | 1/2013 | Seekins et al. | |
| 2013/0073788 A1 | 3/2013 | Post et al. | |
| 2013/0080691 A1 | 3/2013 | Weingarten et al. | |
| 2013/0100600 A1 | 4/2013 | Yin et al. | |
| 2013/0124792 A1 | 5/2013 | Melik-Martirosian et al. | |
| 2014/0108891 A1 | 4/2014 | Strasser et al. | |

OTHER PUBLICATIONS

Texas Instruments, Power Management IC for Digital Set Top Boxes, SLVSA 10A, pp. 1-22, Sep. 2009.

International Search Report and Written Opinion dated Dec. 20, 2013, received in PCT/US2013/045282, which corresponds to U.S. Appl. No. 13/493,949, 7 pages (Ellis).

Cooke, "Introduction to Flash Memory (T1A)," Flash Memory Summit, Aug. 22, 2008, Micron Technology, Inc., 102 pages.

(56) References Cited

OTHER PUBLICATIONS

Gal et al., "Algorithms and Data Structures for Flash Memories." ACM Computing Surveys, Jun. 2005, Vol, 37, No. 2, 30 pages.

O'Brien, "SMART Storage Systems Optimus SAS Enterprise SSD Review," SMART Storage Systems. Oct. 9, 2012, 44 pages.

Spanjer, "Flash Management—Why and How?" Smart Modular Technologies. Nov. 2009, http://www.scantec.de/fileadmin/pcf/Smart_Modular/Flash-Management.pdf, 14 pages.

International Search Report and Written Opinion dated Jun. 12, 2014, received in PCT/US2014/018972, which corresponds to U.S. Appl. No. 13/779,352, 12 pages (Schmier).

International Search Report and Written Opinion dated May 14, 2014, received in International Patent Application no. PCT/US2014/017168, which corresponds to U.S. Appl. No. 14/076,115, 6 pages (Fitzpatrick).

International Search Report and Written Opinion dated May 14, 2014, received in International Patent Application No. PCT/US2014/017169, which corresponds to U.S. Appl. No. 14/076,148, 6 pages (Fitzpatrick).

* cited by examiner

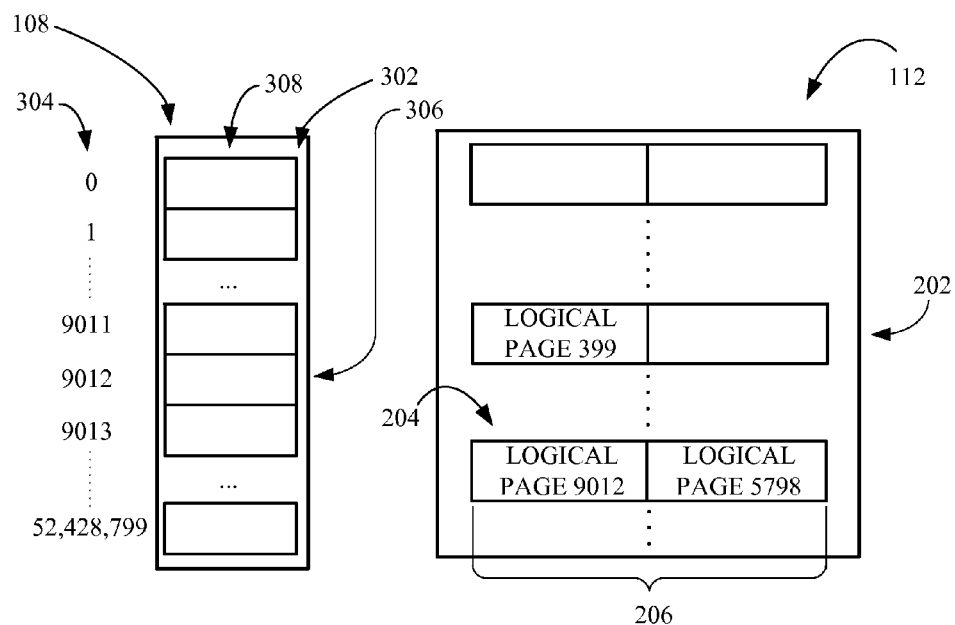
FIG. 5
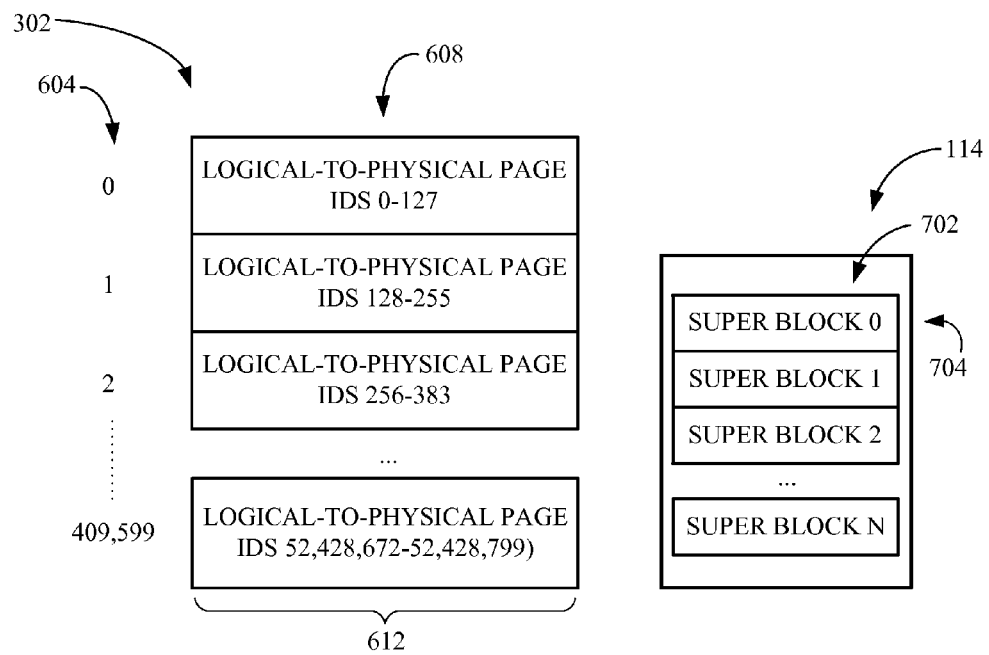
FIG. 6
FIG. 7

STORAGE CONTROL SYSTEM WITH CHANGE LOGGING MECHANISM AND METHOD OF OPERATION THEREOF

CROSS-REFERENCE TO RELATED APPLICATION(S)

This application claims the benefit of U.S. Provisional Patent Application Ser. No. 61/440,400 filed Feb. 8, 2011, and the subject matter thereof is incorporated herein by reference thereto.

TECHNICAL FIELD

The present invention relates generally to a storage control system, and more particularly to a system for data management and control.

BACKGROUND ART

Recently, forms of long term storage other than electromechanical hard disks have become feasible for use in computers. One of these is flash electrically erasable programmable read only memory (EEPROM). Flash EEPROM memory is comprised of a large plurality of floating-gate field effect transistors arranged as memory cells in typical row and column fashion with circuitry for accessing individual cells and placing the memory transistors of those cells in one of two memory conditions.

A flash memory cell, like a typical EEPROM cell but in contrast to dynamic random access memory (DRAM), retains information when power is removed. Flash EEPROM memory has a number of characteristics, which adapt it to use as long term memory. It is light in weight, occupies very little space, and consumes less power than electromechanical disk drives. More importantly, it is especially rugged. It will withstand without adverse effects repeated drops each of which would destroy a typical electromechanical hard disk drive. A problem exhibited by flash memory is that it tends to have a limited life in use.

Thus, a need still remains for better data management devices. In view of the increasing demand for data management devices, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a storage control system including: providing a memory controller; accessing a volatile memory table by the memory controller; writing a non-volatile semiconductor memory for persisting changes in the volatile memory table; and restoring a logical-to-physical table in the volatile memory table, after a power cycle, by restoring a random access memory with a logical-to-physical partition from a most recently used list.

The present invention provides a storage control system including: a memory controller; a volatile memory table accessed by the memory controller; a non-volatile semiconductor memory written for persisting changes in the volatile memory table; and a logical-to-physical table in the volatile memory table, restored after a power cycle, by a random access memory restored with a logical-to-physical partition from a most recently used list.

Certain embodiments of the invention have other steps or elements in addition to or in place of those mentioned above. The steps or element will become apparent to those skilled in the art from a reading of the following detailed description when taken with reference to the accompanying drawings.

BRIEF DESCRIPTION OF THE DRAWINGS

FIG. 5 is an example of writing the flash page of FIG. 4.
FIG. 6 is the logical-to-physical table of FIG. 3 in further detail.
FIG. 7 is an example of a logical-to-physical update log.

BEST MODE FOR CARRYING OUT THE INVENTION

Figure 1:
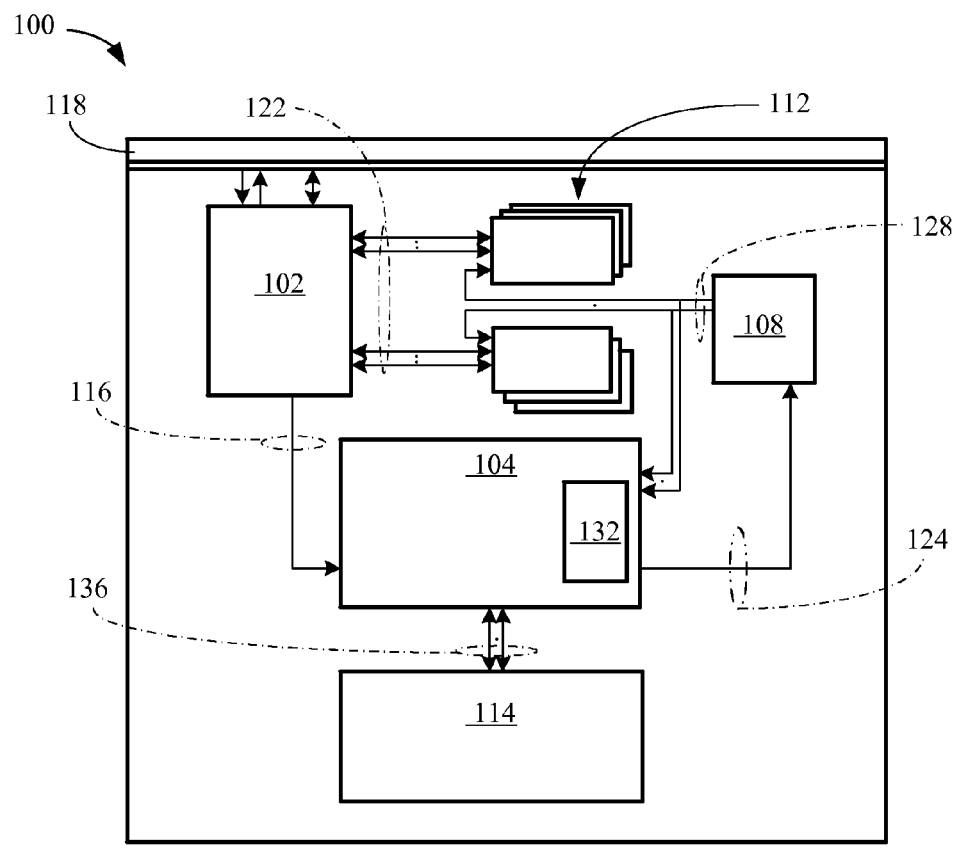
FIG. 1 is a storage control system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The term "K" refers to decimal numerical value of one thousand and twenty four. The term "bit" refers to a decimal numeric value of zero or one, represented, and expressed in a binary numeral system or base-2 number system. The term "B", also referred to as a byte, refers to an eight bit representation having a decimal numeric value between zero and two hundred and fifty five, inclusive. The term "KB" refers to one thousand and twenty four bytes.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

Referring now to FIG. 1, therein is shown a storage control system 100 in an embodiment of the present invention. Shown are semiconductor devices that can include a storage controller 102, a memory controller 104, a volatile memory table 108, at least one non-volatile semiconductor memory 112, and a non-volatile memory space 114.

For illustrative purposes, the storage control system 100 is shown having the storage controller 102, the memory controller 104, the volatile memory table 108, at least one non-volatile semiconductor memory 112, and the non-volatile memory space 114. It is understood that the storage control system 100 can have any number of similar or different semiconductor devices. For example, the memory controller 104 could be physically integrated in the storage controller 102 and the non-volatile memory space 114 could physically be in a portion of one or more of the non-volatile semiconductor memory 112.

The non-volatile semiconductor memory 112 can also be referred to as a NVS memory 112. The non-volatile memory space 114 can also be referred to as a NVM space 114. Hardware, software, or a combination thereof can be used to handle, control, and refresh the semiconductor devices or the storage control system 100.

Any software used to control or monitor the semiconductor devices can also be referred to as a flash layer. Portions of the flash layer can be implemented in hardware to optimize product cost or performance.

For illustrative purposes, the NVM space 114 is shown as a separate module. The NVM space 114 can be physically integrated in one of the semiconductor devices or outside the storage control system 100. For example, the NVM space 114 can physically be a reserved portion of the NVS memory 112.

In another example, the NVM space 114 can be a semiconductor chip physically located outside the storage control system 100 and electrically connected to the storage control system 100 using a separate interface.

Contents of the NVM space 114 is used to reconstruct or rebuild all or portions of contents of the volatile memory table 108. The volatile memory table 108 can also be referred to as a VM table 108 and can include ram, DRAM, DDRAM, SRAM, SDRAM, or any volatile semiconductor memory device. The contents of the VM table 108 must have current information to ensure proper access to data in the NVS memory 112. The NVM space 114 is updated any time a change or update is made to the VM table 108 to enable the NVM space 114 to have the capability to restore or initialize the VM table 108.

In addition to the semiconductor devices, the storage control system 100 includes at least one system connector 118. The system connector 118 can provide electrical connectivity between the storage controller 102 and a host (not shown), such as a computer, test machinery, a cell phone, a video device, or any component having electronics requiring storage or retrieval of customer data using a customer data bus 122.

The storage controller 102 forwards a customer data address on a data address bus 116 received from the host to the memory controller 104 to electrically connect to or access physical locations within the NVS memory 112. The storage controller 102 can receive a read command and respond by sending customer data on the customer data bus 122, previously stored in the NVS memory 112, such as such as flash, NAND flash, NOR flash, NVRAM, or any non-volatile semiconductor memory device, to the host through the system connector 118.

The storage controller 102 can receive a write command and the customer data from the host to be written or stored in to the NVS memory 112, such as such as flash, NAND flash, NOR flash, or any non-volatile semiconductor memory device. The storage controller 102 can receive other commands that result on the reading, writing, or a combination of read and write operations to the NVS memory 112.

The storage controller 102 can also include an allocation unit, referred to as an AU, containing data, error correction code (ECC), and metadata and always processed as one unit. The AU cannot be subdivided in such a way to access components within it as the ECC applies to all of the components in the AU as a group. There may be one or more AUs stored in a physical page but the controller processes elements on AU boundaries.

The data address bus 116 can be referred to as a DA bus 116. The memory controller 104 receives control signals and the customer data address from the storage controller 102. The memory controller 104 forwards the customer data address on the DA bus 116 from the storage controller 102 to the VM table 108 using a logical address bus 124, also referred to as a LA bus 124.

The VM table 108 contains a table that effectively maps or translates the customer data address from the LA bus 124 to electrical signals 128 sent from the VM table 108 to the NVS memory 112. The electrical signals 128 are used to connect, control, or access one or more physical memory locations of the NVS memory 112 for reading or writing of data, including the customer data.

The electrical signals 128 can include signals representing flash addresses, physical memory chip address, semiconductor chip selects, page addresses, subpage addresses, erase block controls, channel selects, multiplexor circuit controls, write inhibits, user defined address banks, user defined selects, or any combination thereof.

The control signals from the storage controller 102 to the memory controller 104 can be used to indicate whether a pending memory operation will access a physical memory location without modifying any physical memory location for the customer data in the NVS memory 112 or modify the physical memory location designated for the customer data in the NVS memory 112.

An example of a pending memory operation that would not require any modifications to any physical memory location for the customer data is a normal read operation, free of any disturb related action, from a memory location the NVS memory 112. Examples of a pending memory operation that would require memory modifying operations are a write, an erasure, a re-write, or a reprogram operation, to contents of a memory location in the NVS memory 112.

The VM table 108 is not updated when the pending memory operation is not modifying any physical memory location for the customer data. Also, if the VM table 108 is not to be updated, the memory controller 104 does not temporarily save the customer data address on the logical address bus 124 or the DA bus 116 that is associated with the pending memory operation.

The VM table 108 is updated when the pending memory operation is to modify a physical memory location for the customer data. Also, the memory controller 104 can temporarily save the customer data address from the logical address bus 124 or the DA bus 116 that is associated with the pending memory operation into a local buffer 132.

The customer data address saved in the local buffer 132 until change events have been detected by the memory controller 104. Each of the change events are the result of the pending memory operation completion and includes an update to the VM table 108 that includes the VM table 108 sending a different or displaced physical memory location on the electrical signals 128 to the NVS memory 112.

The different or displaced physical memory location stored in the VM table 108 and sent to the NVS memory 112 is captured and stored in the local buffer 132 with the customer data address previously saved. The memory controller can either immediately write the contents of the local buffer 132 or provide several pairs of displaced physical memory locations and corresponding customer data address before writing into the NVM space 114 using a non-volatile memory interface or NVM interface 136.

The NVM interface 136 can be a serial or parallel interface and include a serial peripheral interface (SPI), a firewire interface (P1394), or a user defined interface capable of accessing the non-volatile semiconductor memory of the storage control system 100. The memory controller 104 is persistent in continued updates to the NVM space 114 in response to any of the change events ensuring that the contents of the NVM space 114 represents the current contents of the VM table 108. The contents of the NVM space 114, having current information representing the current contents of the VM table 108, is always available to be used to restore or initialize the VM table 108.

It has been discovered that the NVM space 114 substantially reduces the latency time to initialize the VM table 108 of semiconductor storage devices.

It has been discovered that the NVM space 114 substantially reduces the latency from a power-up or a system recovery until start of customer applications for semiconductor storage devices.

It has been discovered that the NVM space 114 can be updated in parallel with the updating of the VM table 108 to provide zero latency for the NVM space 114 backups and no degradation to the semiconductor storage device performance.

It has been discovered that persistent updates to the NVM space 114 based on the change events substantially reduces the amount of data, the power-down latency, the power-up latency, or the need for additional operational resources from hardware or software to provide maximum semiconductor storage device performance.

It has been discovered that the updates to the NVM space 114 due to the change events can continue indefinitely and does not require any snapshots after the NVM space 114 has been initialized resulting in reliability improvements of the NVM space 114.

Figure 2:
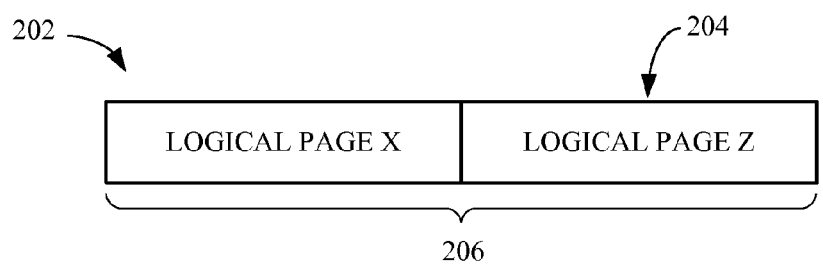
FIG. 2 is an example of a flash page in the storage control system of FIG. 1.

Referring now to FIG. 2, therein is shown a flash page 202 in the storage control system 100 of FIG. 1. The flash page 202 shown can be a data structure representation of the logical page format of the NVS memory 112 of FIG. 1 implemented using NAND flash. There can be one or more AUs in a logical page. The logical page can contain one or more sectors. Also, for example, eight sectors with each of the sectors having five hundred and twelve, five hundred and twenty, or five hundred and twenty eight bytes can be grouped into one logical page.

For illustrative purposes, the flash page 202 is shown having two logical flash pages 204. It is understood that the flash page 202 can have any number of logical pages. For example, the flash page 202 could have been defined have four logical pages.

Also for illustrative purposes, the flash page 202 is shown having a flash page size 206 of 8K bytes, formed from logical pages with a size of 4K bytes. It is understood that the logical pages and the flash page can be any size. For example, the logical pages could have a size of 6K bytes resulting in the flash page having a size of 12K bytes. Flash pages can be of fixed size set forth by the manufacturer as part to the architecture and design of the chip. The variable size of the host pages can make it advantageous to put more or less logical pages in a physical page. NAND flash page sizes have historically been a power of 2. For example, the flash pages can be 1K, 2K, 4K, 8K, or 16K in size. There are also mechanisms to access multiple physical flash pages as one unit. For example, one or more flash pages can be written a time providing an increased data bandwidth for the device.

Figure 3:
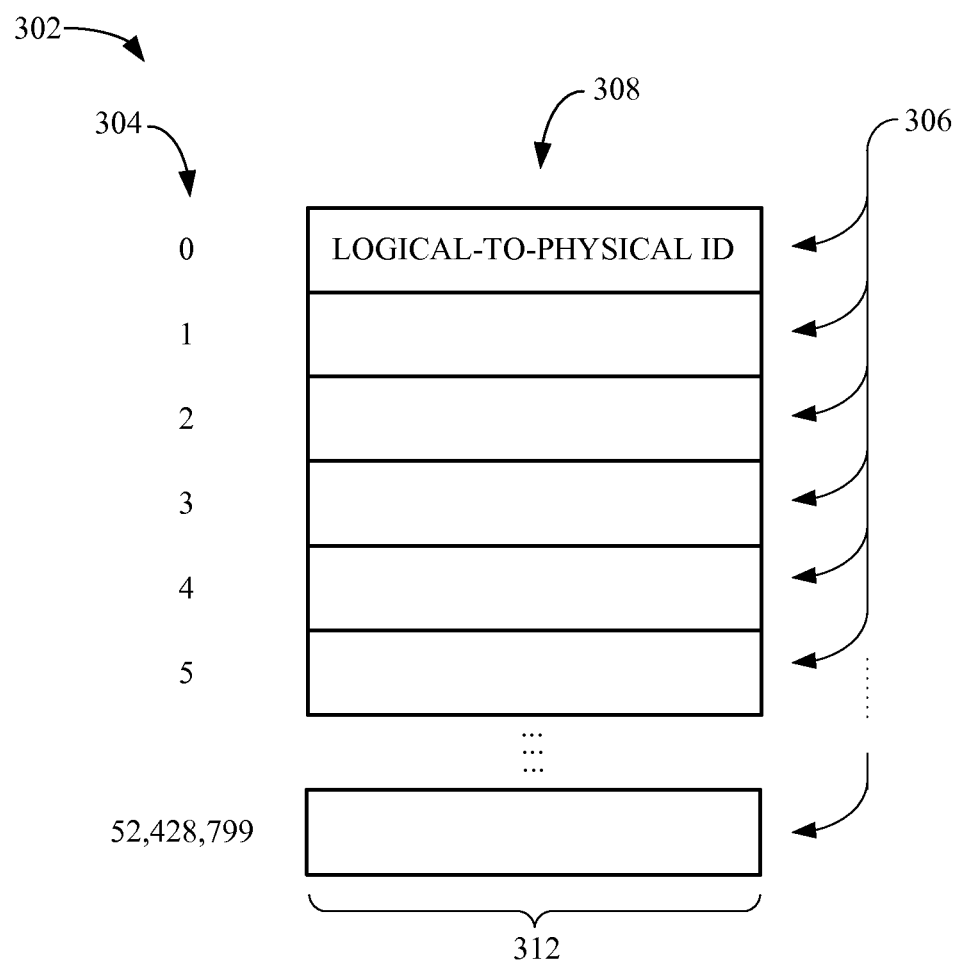
FIG. 3 is an example of a logical-to-physical table in the storage control system of FIG. 1.

Referring now to FIG. 3, therein is shown an example of a logical-to-physical table 302 in the storage control system 100 of FIG. 1. The logical-to-physical table 302, also referred to as a L2P table 302, can be a data structure that translates a system logical identifier of a system file to its physical location that contains the data. A representation of the VM table 108 of FIG. 1 can be implemented using DDRAM.

An example, of a logical page contains 4K bytes of 4K-aligned and contiguous user data for a 512 Byte sector sized semiconductor storage system is discussed. It is understood that the logical page can have other sizes. For example, the logical page could have a size of 8K bytes.

The logical page would be larger than 4K byte if the host is using a 520 or 528 byte sector size. For example, with a 4 KB logical page, the L2P table 302 can be 200 MB to exemplify a logical-to-physical mapping table organized for a 200 GB semiconductor storage system.

The L2P table 302 is organized having a one-directional logical-to-physical mapping to access the NVS memory 112. The L2P table 302 can have a structure that includes logical page numbers 304, logical page entries 306, logical-to-physical identifiers 308, and a physical identifier length 312.

The logical page numbers 304, also referred to as LP offsets 304, identify physical locations of the logical page entries 306 in the L2P table 302 and are not stored in the L2P table 302. The logical page entries 306 can also be referred to as LP entries 306 and contain the logical-to-physical identifiers 308 that can include the physical memory location indirectly used for the generation of the electrical signals 128 of FIG. 1 to connect, control, or access the NVS memory 112 of FIG. 1. The logical-to-physical identifiers 308 can also be referred to as L2P IDs 308.

Each of the L2P IDs 308 in the LP entries 306 have the physical identifier length 312, predetermined and based on a range or size of a specific flash memory system (not shown). The physical identifier length 312 can be referred to as a PIL 312.

For illustrative purposes, the PIL 312 can have a length of four bytes. It is understood that the PIL 312 can be of any length. For example, the PIL 312 can have a length of twenty four bits. In another example, the PIL 312 can have a length of twenty eight bits for a different flash memory system (not shown).

It has been discovered that the NVM space 114 of FIG. 1 can efficiently and quickly back-up the L2P table 302 having a structure formed with the LP offsets 304 and the L2P IDs 308 with the PIL 312 having any length to provide maximum flexibility or adaptability for any size memory system configuration.

It has been discovered that the L2P table 302 can be structured to access any size flash page configuration in the NVS memory 112 to provide a compact sized backup data structure for the NVM space 114.

It has been discovered that the entire L2P table 302 can be rebuilt from the most recent version of the NVM space 114 to provide the storage control system 100 recover from any product power cycle event, in which power is removed and then restored at a later time.

It has been discovered that the most recent version of the L2P table 302 can be determined by either traversing through the NVM space 114 or saving any changes to the structure of the L2P table 302 during a system power down.

It has been discovered that the saving of any changes to the structure of the L2P table 302 during power down can be eliminated by using random-access non-volatile memory for the NVM space 114 resulting in a minimized power down latency.

It has been discovered that storing the entire L2P table 302 having a total storage capacity equal to one tenth of a percent, or less for different logical page size organizations, of the logical drive capacity of a memory system in DDRAM provides optimal random-read performance over memory systems without the L2P table 302 of the present invention.

It has been discovered that contents of the NVM space 114 can be used to identify regions of the data structure that are seldom used and can be made available for providing additional redundant methods or structures used to rebuild the L2P table 302 resulting in a high reliability and availability semiconductor storage system.

It has been discovered that the combination of the NVM space 114 and the VM table 108 provide the storage control system 100 with the capability to rebuild the data structure of the VM table 108 only as need, minimizing flash wear and read disturb errors resulting in a extremely reliable semiconductor storage system.

Figure 4:
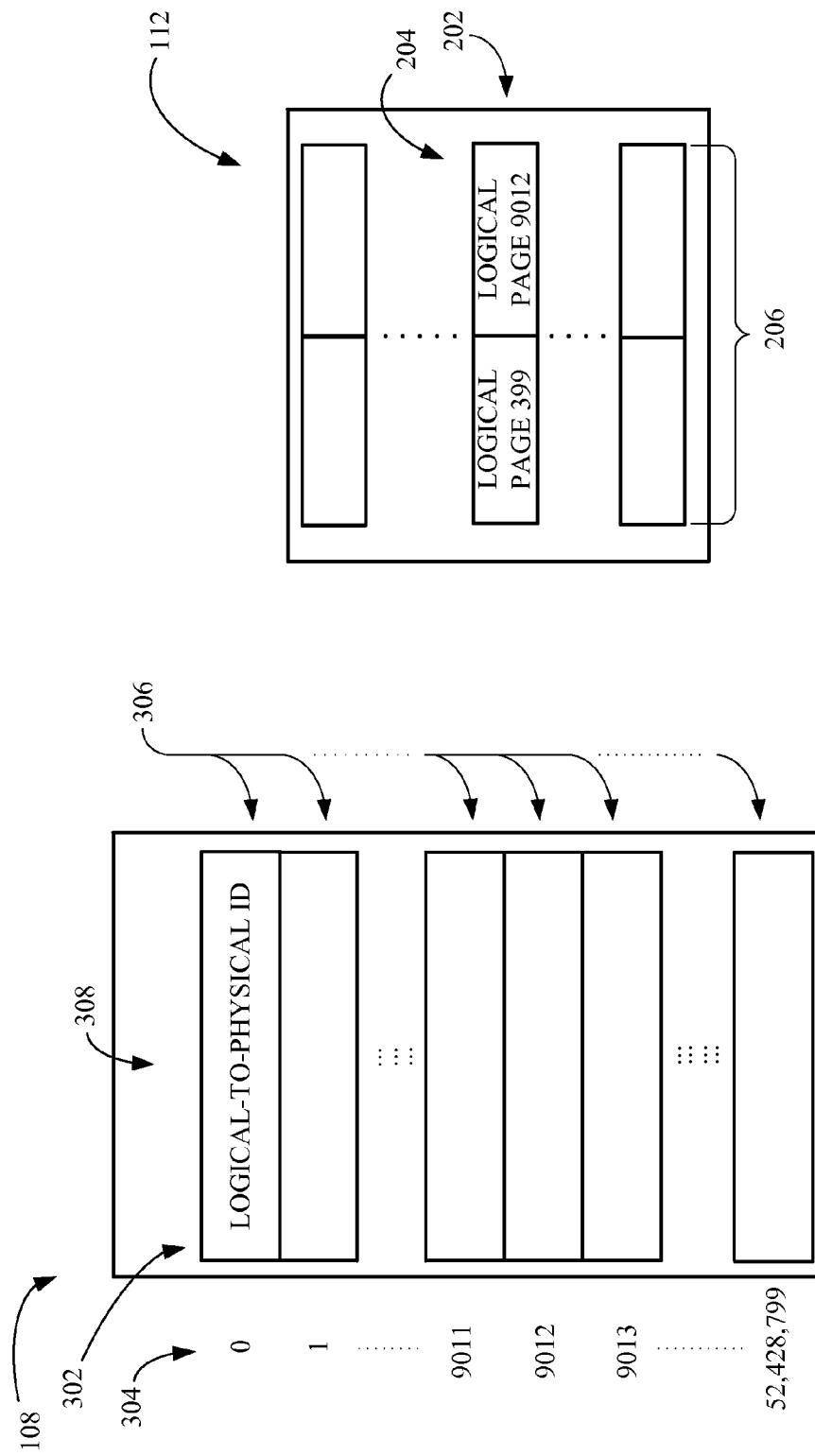
FIG. 4 is an example of reading the flash page of FIG. 2.

Referring now to FIG. 4, therein is shown an example of reading the flash page 202 of FIG. 2. The L2P table 302 of FIG. 3, representing the data structure of the VM table 108 of FIG. 1, is shown having the L2P IDs 308 that are used to identify each of the logical flash pages 204 that make up the data structure of the NVS memory 112.

For illustrative purposes, two of the logical flash pages 204 are labeled and identified as logical page 399 and logical page 9012, respectively. It is understood that the labels and identifiers are arbitrary and the customer data in the NVS memory 112 is often non-sequential and often physically distributed and relocated randomly in the NVS memory 112. For example, the logical page 9012 could be physically located at the first location of the first flash page 202 of the NVS memory 112 in a subsequent operation from the host. In another example, the logical page 9012 could be further physically relocated to the last flash page 202 of the NVS memory 112.

An application of the host can request data from a customer data address that corresponds to one of the LP offsets 304 that identifies one of the LP entries 306 physically in the L2P table 302. The L2P IDs 308 stored in the one of the LP entries 306 is translated and interpreted to generate the electrical signals 128 of FIG. 1 that identifies and accesses the logical flash page 202 in the NVS memory 112 containing the data requested by the application.

In this example, the application of the host requests to read from a customer data address, known to the application only as having an address of nine thousand and twelve. The L2P table 302 in the VM table 108 can be indirectly used for purposes of generating the electrical signals 128 to access the physical location of the logical flash page 202 in the NVS memory 112 that corresponds to the data, labeled as the logical page 9012 in this example.

The storage control system 100 of FIG. 1 reads and sends to the application the contents of the NVS memory 112, as referenced and known by the application as the logical page 9102, to the application of the host. The application receives the data and is unaware of any logical to physical translations or physical to logical translations performed by the storage control system 100 used to retrieve the data from the NVS memory 112.

Referring now to FIG. 5, therein is shown an example of writing the flash page 202 of FIG. 4. Writing or updating the flash page 202 often involves physically displacing the location of new data to a different physical location of the NVS memory 112 of FIG. 1. Data can be written at a page level and erased at an erase block level.

In this example, the application of the host is performing a write operation to update the customer data address known as nine thousand and twelve by the application. The storage control system 100 of FIG. 1 receives the customer data address of nine thousand and twelve from the application of the host.

The storage control system 100 records and flags the L2P IDs 308 in the LP entries 306 corresponding to the customer data address known as nine thousand and twelve by the application as invalid. The invalidation may occur before, during, or after the write operation. The storage control system 100 updates the L2P IDs 308 at the LP entries 306 corresponding to the physical location of nine thousand and twelve of the VM table 108 with a different physical location previously identified, flagged, and chosen by the storage control system 100 as available for immediate use.

The write operation is executed and the newly updated L2P IDs 308 in the VM table 108 is translated and interpreted to generate the electrical signals 128 of FIG. 1 that identifies and accesses a logical flash page 202 in a physically different location in the NVS memory 112. The physically different location in the NVS memory 112 is shown adjacent to a logical flash page 202 labeled as logical page five thousand and ninety eight. Note that before the write operation, the L2P IDs 308 in the VM table 108 corresponded the logical flash page 202 adjacent a logical flash page 202 labeled as three hundred and ninety nine as shown in FIG. 4.

It has been discovered that maintaining the NVM space 114 of FIG. 1 with current changes applied to the VM table 108 is crucial to the reliability, availability, and performance expected of a storage control system.

Referring now to FIG. 6, therein is shown the logical-to-physical table 302 of FIG. 3 in further detail. The L2P table 302 can have a data structure indexed by logical-to-physical-partition-offsets referred to as L2P partition offsets 604 in a manner similar to the VM table 108 of FIG. 1 and the L2P IDs 308 of FIG. 3, respectively. Each of the L2P partition offsets 604 identify a group of the LP entries 306 of FIG. 3.

Each of the physical location of entries in the L2P table 302 contains multiple logical-to-physical-page IDs referred to as L2P page IDs 608. Each of the L2P page IDs 608 have a physical identifier length, referred to as a PIL 612 in a manner similar to the PIL 312 of FIG. 3.

Each of the L2P page ids 608 can be used to generate the electrical signals 120 of FIG. 1 to connect, control, or access the NVS memory 112 of FIG. 1 in a manner similar to the L2P IDs 308 of FIG. 4. Since each of the L2P partition offsets 604 has a fixed size, each of the L2P partition offsets 604 can be physically located in the L2P table 302 by multiplying each of the L2P partition offsets 604 by the PIL 612 in a manner similar to accessing an element in an array.

Each individual L2P page IDs 608 within one of the L2P partition offsets 604 can be physically located by an offset from a starting location at the beginning of each of the L2P partition offsets 604 in a manner similar to the LP offsets 304 of FIG. 3.

For purposes of discussion, each of the L2P partition offsets 604 can be formed having the PIL 612 equal to 512-bytes and each of the L2P partition offsets 604 can have one hundred twenty eight L2P page IDs 608 on a 200 GB drive. It is understood that the L2P partition offsets 604 or the quantity of the L2P page IDs 608 can be changed, resulting a larger or smaller quantity of storage space needed in the volatile memory of the VM table 108 of FIG. 1.

Referring now to FIG. 7, therein is shown an example of a logical-physical update log. The logical-physical update log, also referred to as a L2P update log 702, is an example of a data structure in the NVM space 114. The L2P update log 702 must be updated in a persistent manner to reflect any updates to the VM table 108 of FIG. 1. Since the VM table 108 is modified whenever the location of a logical flash page is changed, updates to the NVM space 114 must be kept with modifications to the VM table 108 to enable the VM table 108 to be rebuilt across power cycles using the L2P update log 702 in the NVM space 114.

This section describes how changes to the VM table 108 can be captured using the L2P update log 702 in the NVM space 114. Super log blocks 704 can be referenced to determine how the VM table 108 has been updated. The L2P update log 702 can span multiple of the super log blocks 704. The super log blocks 704 of the L2P update log 702 can be scattered throughout the drive and there is no restriction on the use of the super blocks. The super log blocks 704, when in chronological order, form a sequential log. This sequential log operates in read only mode during drive initializations.

Figure 8:
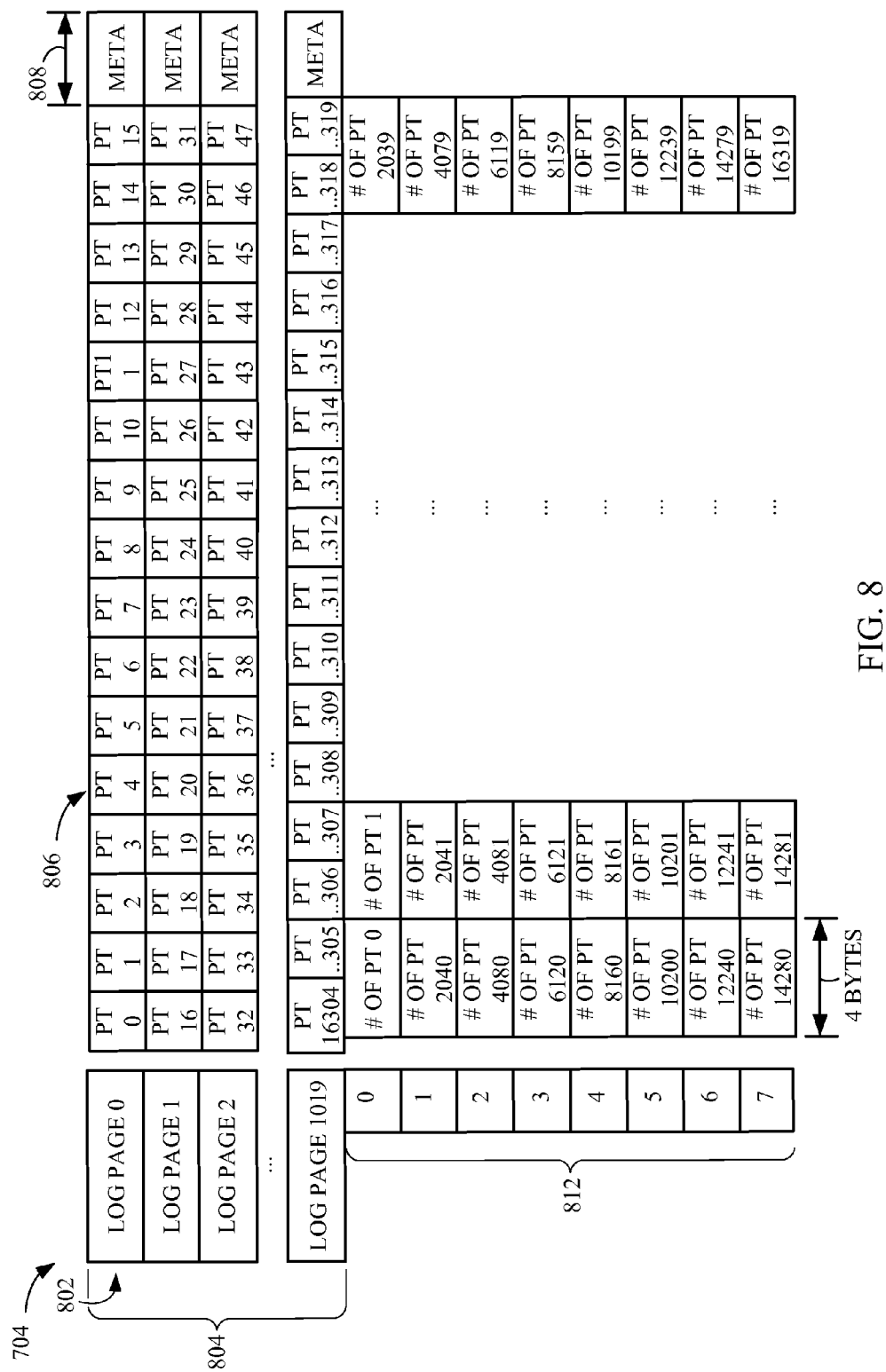
FIG. 8 is an example of a log super block page of one of the super log blocks of FIG. 7.

Referring now to FIG. 8, therein is shown an example of a log super block page of one of the super log blocks 704 of FIG. 7. The structure of the super log blocks 704 can have a 1024-page size with 8 KB log pages having sixteen 512 byte sized partitions. Each of the super log blocks 704 of the L2P update log 702 of FIG. 7 can have the same structure. The 8 KB log pages can also be referred to as 8 KB_LPs 804.

The log super block page 802, can be referred to as a L_SB page 802. The L_SP page 802 can contain up to sixteen 512-byte partitions. Each of the byte partitions can also be referred to as L2P partitions 806. The 512-byte partitions contain the actual data from the VM table 108 of FIG. 1. Note that L_SP page 802 is written as a single atomic flash write. Metadata 808 stored with the L_SB page 802 of each of the 8 KB_LPs 804 contains the partition numbers of the partitions stored in each of the L_SB page 802.

Metadata pages 812 contain an index of all the metadata 808 in each of the 8 KB_LPs 804 within the super log blocks 704. The index includes all of the partition numbers of all partitions that are stored within the 8 KB_LPs 804 of each of the super log blocks 704. The metadata pages 812 provide a function similar to the logical page identified as a Page 63 used to manage, recycle, or group the metadata 808 for rebuilding, building, and tracking across tabling information during power cycles and used to recover from memory corruptions during normal operations. The metadata pages 812 enables efficient and quick access to the metadata 808 of the 8 KB_LPs 804 without having to individually read each and every one of the 8 KB_LPs 804.

It has been discovered that the metadata 808 provides a redundancy in the event of loss or corruption of the metadata pages 812 and can be used to rebuild the metadata pages 812, provide superior fault tolerance performance, or improve reliability of solid state storage devices.

It has been discovered that the metadata pages 812 provides a redundancy in the event of loss or corruption of the metadata 808 and can be used to rebuild any of the metadata 808 of the 8 KB_LPs 804, provide superior fault tolerance performance, or improve reliability to solid state storage devices.

It has been discovered that the metadata pages 812 provides the flash layer or hardware of solid state storage devices the ability to quickly access the metadata 808 for rapid analysis, initialization, or rebuild of the VM table 108 of FIG. 1 on startup or for exception recovery.

It has been discovered that the metadata pages 812 provides the flash layer or hardware of solid state storage devices the ability to quickly retrieve the metadata 808 and provides the flash layer or the hardware with a redundant or backup copy of the metadata 808.

Figure 9:
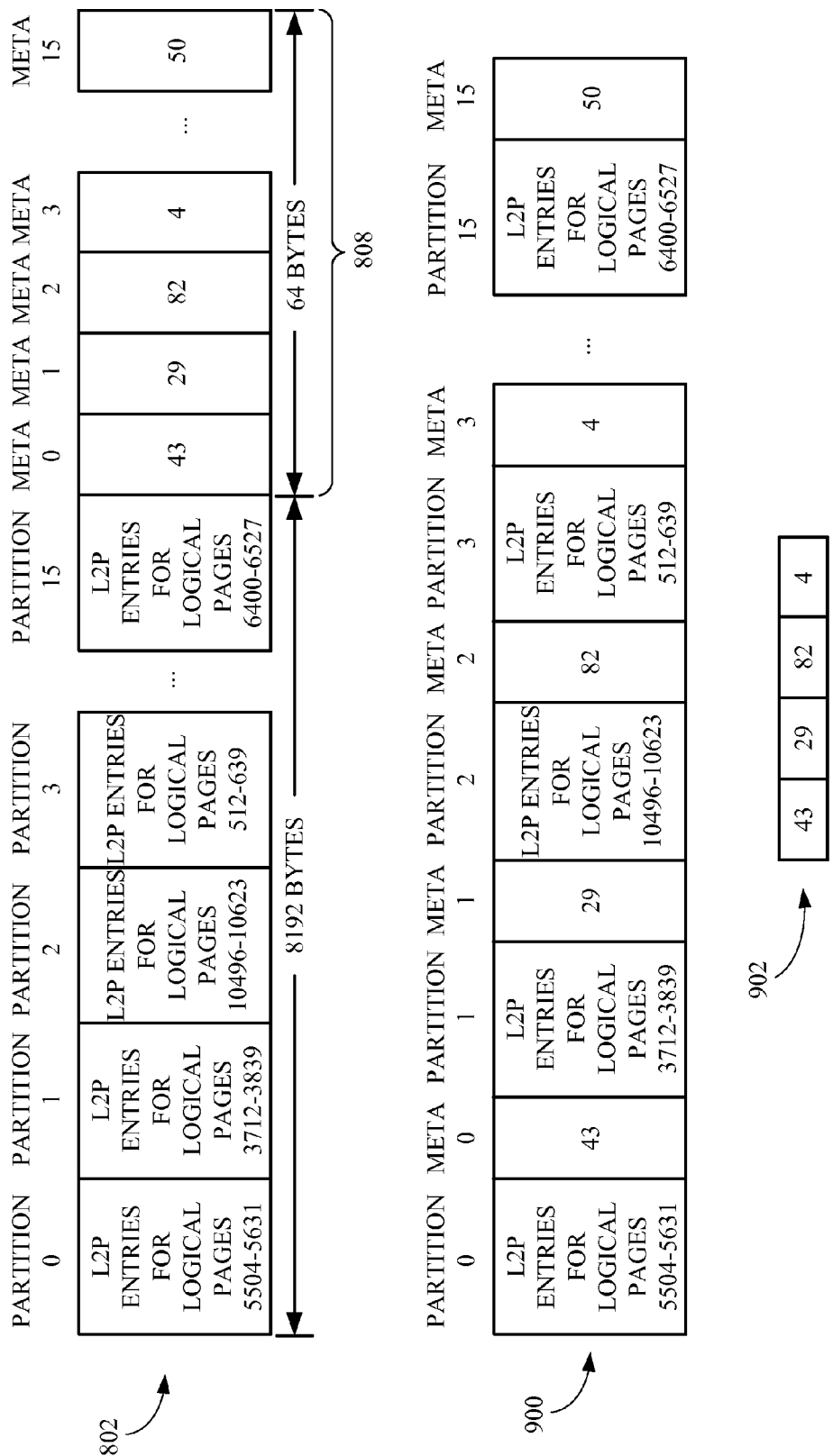
FIG. 9 is an example of the log super block page of FIG. 8.

Referring now to FIG. 9, therein is shown an example of the log super block page 802 of FIG. 8. For illustrative purposes, contents of the log super block page 802, also known as the L_SB page 802 of FIG. 8, are shown to contain sixteen partitions with the metadata 808 having partition numbers starting with forth three, twenty nine, eighty two, four, and ending with fifty, respectively. It is understood that the contents of the L_SB page 802 can be different. For example, the L_SB page 802 could have been defined having twice as many partitions and metadata 808. In another example, the metadata 808 could allocate some bits for defect flags or recycle counts.

For illustrative purposes, a logical structural organization 900 of the L_SB page 802 is shown. Note that the exact layout or structure of the L_SB page 802 of the 8 KB log pages 800 is optimized for the best overlay of the layout or the structure with a host data page. It is understood that the logical structural organization 900 could be different. For example, the logical structural organization 900 could have been represented having consecutive pairs of partitions separated by consecutive pairs of metadata, such as partition 0, partition 1, metadata 0, metadata 1, partition 2, partition 3, and etc.

Also shown is an example of first four elements 902 of one of the metadata pages 812 of FIG. 8. The first four elements 902 or entries of the one of the metadata pages 812 having four bytes each can contain the first four partition numbers corresponding to the first four partitions in the L_SB page 802.

It has been discovered that the metadata pages 812 and the metadata 808 with robust redundancy protection can be used to provide additional user defined information for the initialization of the VM table 108, power-up, or power-down of the semiconductor storage device.

Figure 10:
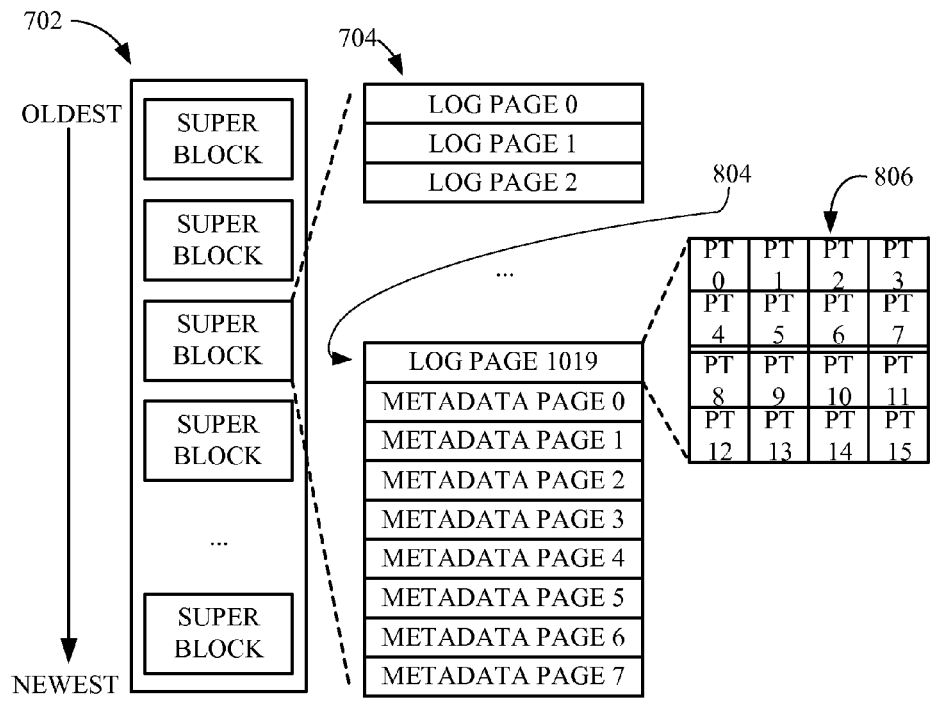
FIG. 10 is a detailed example of the logical-to-physical update log of FIG. 7.

Referring now to FIG. 10, therein is shown a detailed example of the logical-to-physical update log of FIG. 7. The logical-to-physical update log, also known as the log L2P update log 702 of FIG. 7, is shown having the super log blocks 704 of FIG. 7. A change to the L2P table 302 of FIG. 3, due to a host write of or recycling of a logical page, can be captured by modifying and writing the L2P partitions 806 to one of the 8 KB_LPs 804 of the super log blocks 704. The L2P partitions 806 can, as an example, have a size of one 8K flash page.

The L2P update log 702 can require more writes for random small-block sized host writes than for large and/or sequential host writes. The number of 8 KB_LPs 804 or the super log blocks 704 written depends on how the drive is being used and the number of L2P page IDs 608 of FIG. 6 updated. For example, a 128 KB large-block write will change one or two of the L2P page IDs 608 of the L2P table 302. For sequential writes, the L2P page IDs 608 is rewritten only when a partition boundary is crossed. One of the L2P page IDs 608 must be written for every host write for 4K random writes.

Whenever the flash page 202 of FIG. 2 is rewritten or moved, the L2P partition offsets 604 containing the L2P page IDs 608 is written to one of the 8 KB_LPs 804. Writes to the 8 KB_LPs 804 can increase write amplification. The size of the L2P update log 702 can have a size equal to or greater than the L2P table 302, such a one times, five times, ten times, or of any multiple times the size of the L2P table 302.

The L2P update log 702 can be used to rebuild the L2P table 302 during initialization. The initialization process occurs in two steps: first step is to rebuild the L2P table 302 and second step is to rebuild the L2P page IDs 608.

The main focus during initialization is to rebuild the L2P table 302. The L2P table 302 identifies the location of each partition in the flash, such as the L2P page IDs 608. The L2P update log 702 can be used to load the portion of the L2P table 302 first accessed before the entire L2P table 302 has been rebuilt to service host commands before the L2P table 302 has been fully loaded into the volatile memory table 108 or non-volatile memory.

In order to initialize the L2P table 302, the memory controller 104 determines the most recent version of each of the L2P partition 806 of FIG. 8. The L2P table 302 can be rebuilt by copying the most recent version of each partition into the appropriate location in the L2P table 302.

L2P update log 702 is traversed to determine the most recent version of each of the L2P partition 806 of FIG. 8. The super log blocks 704 are identified in chronological order in the L2P update log 702 to permit reversed chronological ordering of the entries in the L2P update log 702. The first entry in the reversed chronological order corresponds to the most recent version of the L2P update log 702.

An example of an initialization of a data structure includes identifying the super log blocks 704 that comprise the L2P update log 702, sorting the super log blocks 704 in reverse chronological order using a sequence number of super log blocks 704, and evaluating the metadata pages 812 of FIG. 8 for each of the super log blocks 704 in reverse order. Each partition initialized and determined to have a partition element previously initialized is skipped and considered stale. A partition that is not initialized is considered the most recent version and used to initialize the L2P page IDs 608 in the L2P table 302.

For example, a 420 GB drive with 1 KB partitions using the L2P update log 702 with a size equal to, five times greater than, or ten times greater than a size of the L2P table 302 can have total initialization times of four hundred and thirty, six hundred and two, and eight hundred and seventeen milliseconds, respectively. The total initialization times assume reads of the metadata pages 812 can be overlapped with writes to different flash devices, such as the NVS memory 112 of FIG. 1 and can change based on the read latency of the NAND flash.

It is assumed that the metadata pages 812 of the super log blocks 704 can be read and partition entries of the super log blocks 704, such as partition entries, can be processed in parallel. Also, the total initialization times assume that writing the L2P table 302 will take no more than one microsecond and skipping an invalid entry will take no more than one hundred nanoseconds and can change based on the read latency of the NAND flash. For example, the total initialization times can improve as the read latency of NAND flash improves After initializing the L2P table 302, none, some, or all of the L2P table 302 of FIG. 3 will need to be initialized. The L2P table 302 will need to be initialized and patched up for the writes in the super log blocks 704 that are open, having writeable memory locations. The partition from the L2P table 302 needs to be read for each of the L2P page IDs 608 in the super block 702 that are open. Also partitions from the metadata pages 812 need to be read from only the most-recent logical page version of multiple versions of the particular page in the super log blocks 704 that are open. The L2P page IDs 608 for that logical page can be read and compared against the location in the super block 702 that is open. If entries of the L2P page IDs 608 match entries of the location in the super block 702 that is open, the change to the L2P table 302 has been captured.

If the entries of the L2P page IDs 608 match do not match entries of the location in the super block 702, the entries of the L2P page IDs 608 are patch up with corrected entries and a need to schedule the 8 KB_LPs 804 to be written to the super log blocks 704.

Any remaining initialization time can be used to start building the rest of the L2P table 302 or for other initialization tasks such as initializing lists of the super log blocks 704. As an example, the most-recent version of the logical pages has been determined in the super log blocks 704 that are open without any need to flush out any writes to the L2P update log 702.

The L2P update log 702 can represent the state from the last time a Page 63 has been written to one of the super log blocks 704. Changes in the super log blocks 704 that are open do need to be captured because the L2P partitions 806 can be loaded and patched up as described earlier and can eliminate the need to capture all updates, such as changes in the super log blocks 704 that are not open, in the L2P update log 702.

Furthermore, as long as the super log blocks 704 contain the metadata/partition information, there is no requirement that all logging super blocks must have the metadata pages 812. For example, for the L2P update log 702 having a size that is ten times greater than a size of the L2P table 302, the ordered list is 2120 bytes or 530 super blocks times 4 bytes long.

The latency or efficiency from using a SPI or serial peripheral interface to write the ordered list could be improved by writing the ordered list to non-volatile memory and sending the location of the ordered list in the non-volatile memory, not the ordered list itself, using the SPI. If the L2P update log 702 is used in a circular manner, the super log blocks 704 can be continually logged with the SPI and the L2P tabling operations can be handled without any special power-down sequence requirements. It is understood that the non-volatile memory can include NOR flash, NAND flash, or any available non-volatile memory device capable of communicating with the SPI.

If the location of the ordered list in NAND is lost during a power cycle, the location can be recovered by searching through the Page 63s combined metadata pages held within a super block, locate the super log blocks 704, and identify the super log blocks 704 that contain the active section of the open super log blocks 704 that are open. After locating the active section of the super log blocks 704, sequence numbers of the super log blocks 704 can be sorted to determine the ordered list in NAND.

Figure 11:
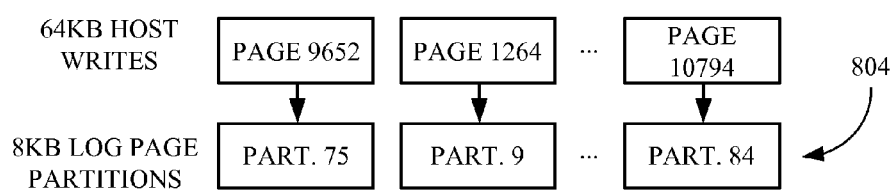
FIG. 11 is an example of random 4K writes.

Referring now to FIG. 11, therein is shown an example of random 4K writes. The random 4K writes from the host triggers the most writes to the 8 KB_LPs 804 of the super log blocks 704 of FIG. 7 and there can be sixteen random 4K writes on the single 8K flash page. The random 4K writes contribute a write amplification factor of one eighth determined as-a-result of sixteen 4 KB host writes and sixteen 512 bytes of flash writes.

Figure 12:
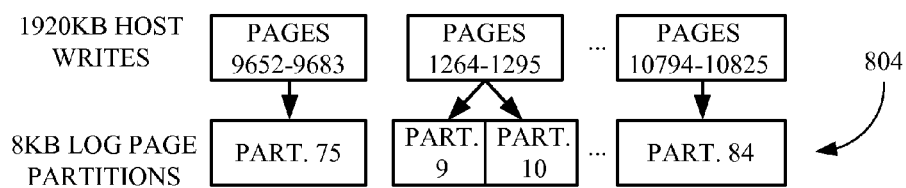
FIG. 12 is an example of large block 128K writes.

Referring now to FIG. 12, therein is shown an example of large block 128K writes. Fifteen 128K writes from the host triggers multiple changes to an L2P page IDs 608 and captured in the 8 KB_LPs 804 of the super log blocks 704 of FIG. 7. The fifteen large block 128K writes contribute a write amplification factor of one two-hundredth and fortieth as-a-result of fifteen 128 KB host writes and sixteen 512 bytes of flash writes.

Figure 13:
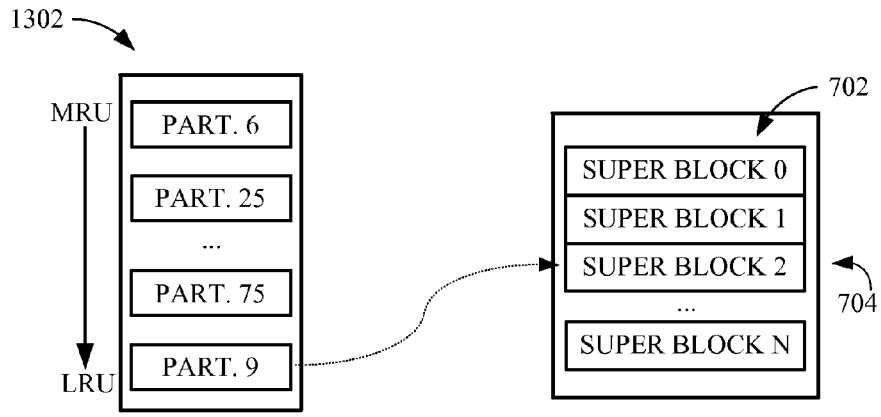
FIG. 13 is an example of a logical-to-physical log write cache.

Referring now to FIG. 13, therein is shown an example of a logical-to-physical log write cache. The logical-to-physical log write cache, also referred to and shown as a cache 1302, can be a part of the memory controller 104 of FIG. 1, the local buffer 132 of FIG. 1, or of any of the semiconductor devices of FIG. 1. The cache 1302 enables more changes to be captured and written in one log write resulting in a smaller write amplification factor.

The flash translation layer (FTL) can delay writing to the L2P update log 702 of FIG. 7 for other writes that can be written to a common partition. The FTL initialization can detect the cached writes to the L2P update log 702. A write of the least recently used (LRU) partitions to the L2P update log 702 is represented and shown by a dotted curved arrow. Benefits of the cache 1302 depend on the use model of the flash layer.

If a multiple pages within the L2P update log 702 are written, multiple changes can be captured for one write to one of the super log blocks 704 of FIG. 7. The FTL should capture the multiple changes with one log write to reduce the write amplification from the write to the one of the super log blocks 704.

The cache 1302 consists of all modified L2P partitions 806 that have not yet been flushed out to the L2P update log 702. The cache 1302 is rebuilt during initialization. The size and complexity of the cache 1302 may depend on available memory and initialization time. The cache 1302 can be used for random writes.

Figure 14:
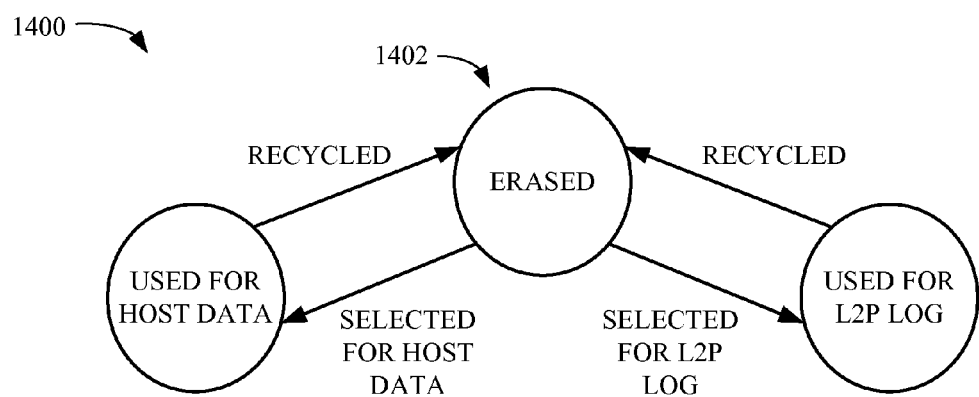
FIG. 14 is a dataflow diagram of recycling the logical-to-physical update log of FIG. 7.

Referring now to FIG. 14, therein is shown a dataflow diagram 1400 of recycling the logical-to-physical update log of FIG. 7. The logical-to-physical update log, also referred to as the L2P update log 702 of FIG. 7, has a maximum size determined by a size allocated for the NVM space 114 of FIG. 1. In the event that the L2P update log 702 is full, one of the super log blocks 704 of FIG. 7 must be recycled for every newly written one of the super log blocks 704. Any one of the super log blocks 704 recycled is erased, grouped in a resource pool 1402, and re-allocated either for host data or for use as one of the super log blocks 704 that is newly written.

The super log blocks 704 come from a resource pool 1402 of available super blocks. Once designated as an erased super block, the erased super block will be allocated as one of the super log blocks 704 to store the 8 KB_LPs 804 of FIG. 8 and the metadata pages 812 of FIG. 8. Any of the super log blocks 704 erased and returned to the resource pool 1402 when no longer needed becomes available for host data or use as one of the super log blocks 704. A super block can be recycled and used for different purposes over its life.

The super log blocks 704 can be written to and allowed to grow before any of the super log blocks 704 need to be recycled. The oldest of the super log blocks 704 can be recycled first. The L2P update log 702 is like a journal and can include multiple obsolete versions of the super log blocks 704.

The L2P update log 702 can be a fully compacted log containing no obsolete entries and having a size similar to a size of the L2P table 302 of FIG. 3. The L2P update log 702 can be expanded to include older versions of the super log blocks 704. The older versions of the super log blocks 704 can be used to identify and isolate static data within the storage control system 100 of FIG. 1.

The amount of growth the L2P update log 702 can expand is limited by the amount of memory allocated for the L2P update log 702. The size of the L2P table 302 and the compacted size of the L2P update log 702 can each be approximately one-tenth of a percent of the drive capacity.

If the L2P update log 702 is allowed to grow ten times in size, it would consume approximately one percent or less of the total capacity of the semiconductor storage device. Increasing the size of the L2P update log 702 will increase the initialization time for the L2P table 302 while provide the capability to save more old versions of the super log blocks 704 and reduce the erase and recycle activities.

It has been discovered that the L2P update log 702 and the size of memory allocated for the L2P update log 702 can be used to optimize the design of any semiconductor storage device for a cost, performance, size, or a combination thereof.

Figure 15:
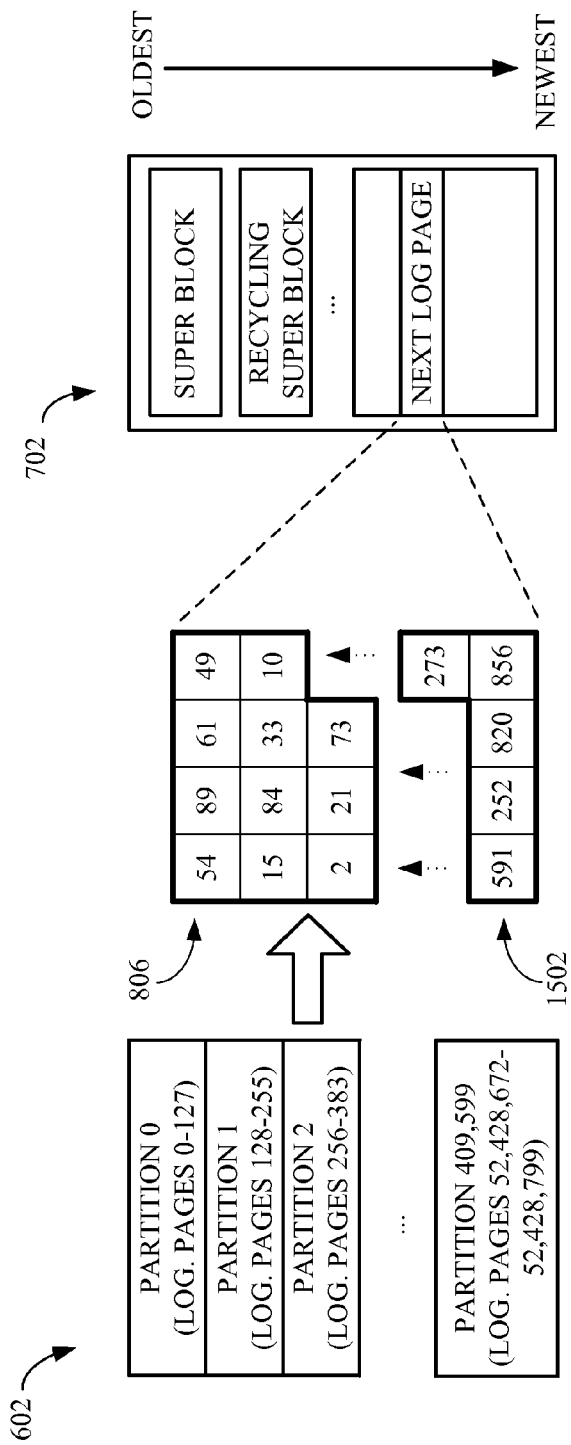
FIG. 15 is a detailed example of recycling of one of the super log blocks of FIG. 7.

Referring now to FIG. 15, therein is shown a detailed example of recycling of one of the super log blocks 704 of FIG. 7. The memory controller 104 of FIG. 1 can be performing recycling operations by identifying and relocating valid partitions while logging the super log blocks 704.

The L2P update log 702 having multiples of the super log blocks 704 require that eventually one or more of the super log blocks 704 be recycled as they become obsolete. Also, the oldest of the super log blocks 704 in the L2P update log 702 will need to be recycled as contents of the L2P update log 702 increase in size.

The 8 KB_LPs 804 of FIG. 8 are not mixed with host data pages in the same super block because of difficulties encountered when attempting to reclaim the super superblock. The larger the L2P update log 702, the easier the recycling process. For example, a log ten times the size of a fully compact log has 1 valid partition for every 9 obsolete partitions. For recycling, the worst case is when the valid partitions are evenly distributed through the L2P update log 702. In the worst case, there would be one valid partition on most the 8 KB_LPs 804.

The partitions do not need to be read out of the 8 KB_LPs 804 that are recycled because the L2P update log 702 contains the most recent version, assuming that the partition has been previously loaded. The valid partitions can be located by reading the metadata pages 812 of FIG. 8 and cross-referencing it with L2P table 302 of FIG. 3.

The worst-case write amplification caused by the writes to the L2P update log 702 are a function of the size of the L2P update log 702. For example, a the L2P update log 702 having a size ten times larger, would result in a worst-case write amplification of 1/10.

The circular wear leveling approach is forced to move log entries having lots of static read only partitions during recycling. The recycling process of the super log blocks 704 can naturally identify potential regions of static data. Separating static data from dynamic data reduces write amplification. The worst write amplification occurs when many of the 8 KB_LPs 804 are obsolete, such as dynamic pages, are evenly distributed throughout the super log blocks 704.

Recycling of the super log blocks 704 could be implemented using a static log for static partitions and a dynamic log for dynamic partitions. The oldest of the super log blocks 704 in the L2P update log 702 is recycled in to the static log. The static log will grow and require recycling, albeit at a much slow pace than the dynamic log. Since the static log does not require any read scrubbing since the static log is read only during initialization.

The L2P partitions 806 entries that are static and their associated logical pages can be grouped together in the static log to prevent interspersion with the dynamic data and increasing the write amplification. The static data can be marked as static and aggregated when moving a valid page during recycling.

For example, a partition marked as static can be moved to a super block having or collecting static data on a recycling of the partition. The L2P partitions 806 of the 8 KB_LPs 804 or the metadata pages 812 that are rarely modified compared to other of the other L2P partitions need to be moved to clean up the oldest of the super log blocks 704 in the L2P update log 702.

These L2P partitions may contain static data and used to identify static host data that can be grouped and separated from dynamic host data to further improve performance and reduce write amplification. Write amplification is greatest with obsolete dynamic pages are evenly distributed throughout super blocks.

It has been discovered that the L2P partitions of the 8 KB_LPs 804 or the metadata pages 812 can be used to identify and isolate static host or static customer data from dynamic flash pages to provide improved wear leveling characteristics that result in superior reliability and product life.

It has been discovered that moving static data for wear-leveling and read-scrubbing purposes to a higher than average program/erase count location results in significant wear leveling characteristic that result in superior reliability and product life.

Figure 16:
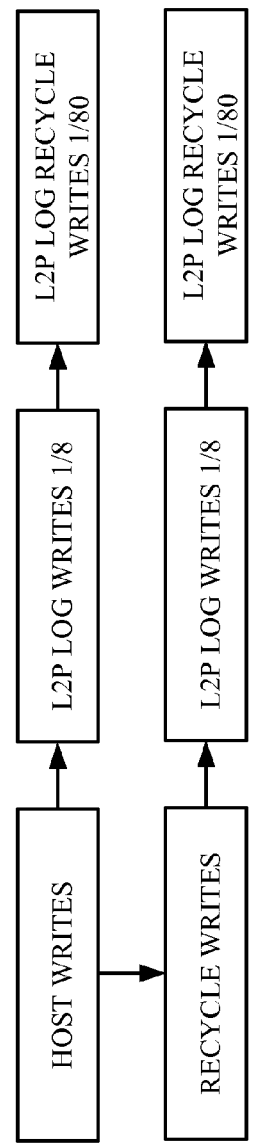
FIG. 16 is an example of write amplification.

Referring now to FIG. 16, therein is shown an example of write amplification. With an 8 KB physical flash page and a 1 KB partition size, for example, eight modified partitions, including ECC, can be stored to the end of the log with a single flash program resulting in the write amplification for random writes of one-eighth.

Writes to a flash page log having large sequential block operations provides significantly smaller write amplifications. For example, writing 128 KB blocks randomly to the 8 KB physical flash page with the 1 KB partition size results in a write amplification of one-two hundred and fifty sixth or one-one hundred and twenty eighth when writes are within single partitions and writes are across two partitions, respectively.

A recycle log, similar to the L2P update log 702, can influence write amplification when recycled. For example, movement related to updates of the L2P partitions 806 can result in page movement within the recycle log.

Assuming eight partitions can be written into one log write operation, the write amplification is at most $1/8^{th}$. As described above, the write amplification is significantly less for large block or sequential operations. The write amplification associated with the recycle operations for a log ten times greater is at most one-eightieth when compared to the original host write of one-eighth.

The recycle writes themselves can trigger their own L2P log write and L2P log recycle writes, which can increase the write amplification for the writes by a maximum of one-eighth.

It has been discovered that the L2P update log 702 with the super log blocks 704 for hosts writes enables large blocks of data to be kept together, aligned, or sequential and recycled to provide minimized write amplification by enabling writes to one or two partitions of NAND flash at a time, resulting in superior drive performance and reliability.

Figure 17:
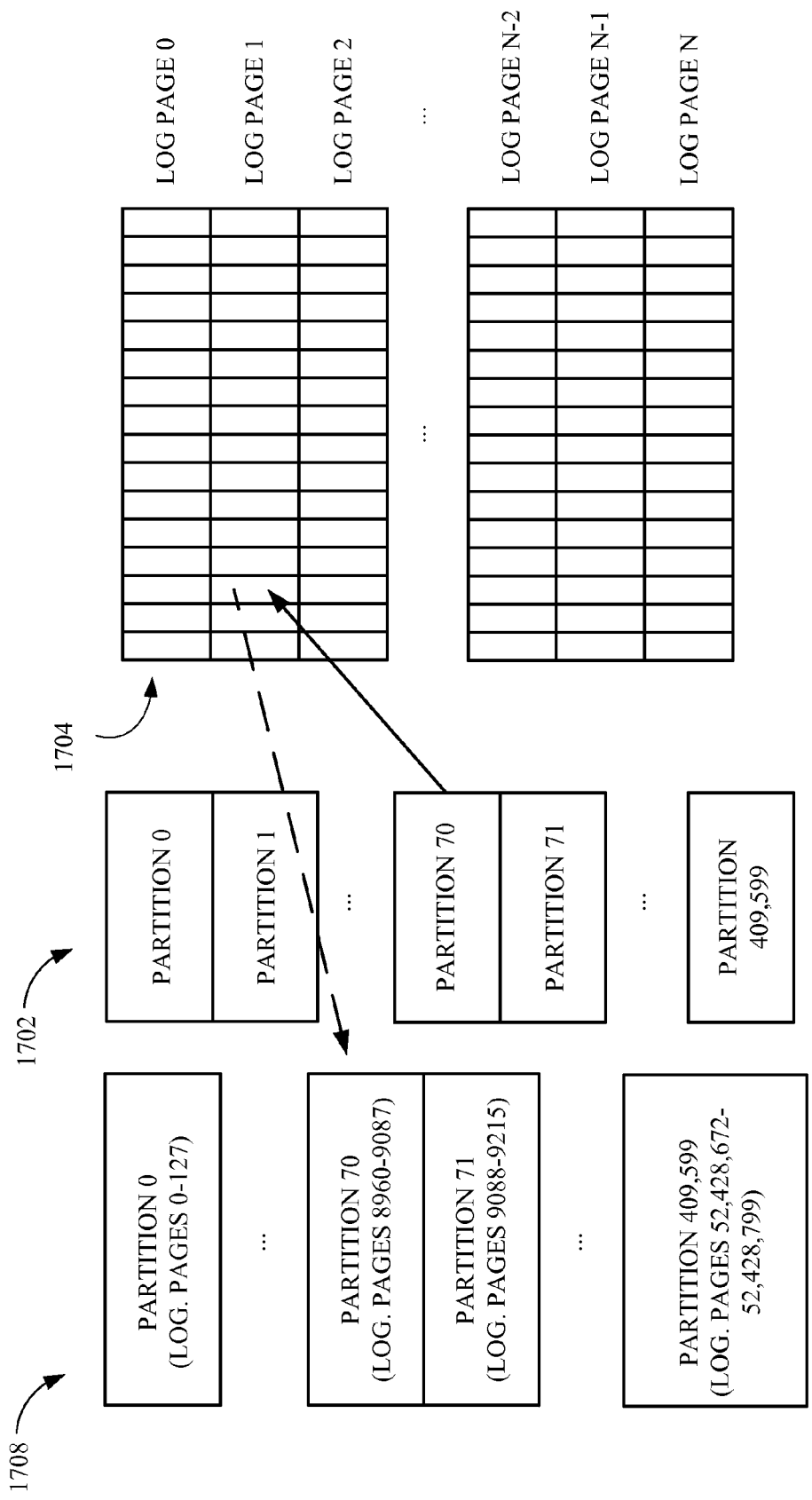
FIG. 17 is an example of a logical-to-physical partition table.

Referring now to FIG. 17, therein is shown an example of a logical-to-physical partition table. Shown is a logical-to-physical partition table, also referred to as a L2P partition table 1702, and logical-to-physical log pages similar to the 8 KB_LPs 804 of FIG. 8.

The logical-to-physical log pages, also referred to as L2P log pages 1704, are used to rebuild a logical-to-physical table 1708, similar to the L2P table 302 of FIG. 3, during initialization. The logical-to-physical table 1708 is used by the host (not shown) to access data in the NVS memory 112 of FIG. 1. The logical-to-physical table 1708, for example, can have a size of one hundred and twenty eight log pages per partition. The size of the logical-to-physical table 1708 is flexible and the size may be driven by requirements such as the initialization time.

The L2P partition table 1702 is smaller than the logical-to-physical table 1708 and can be physically located in a portion of the VM table 108 of FIG. 1 or in separate volatile memory device. The L2P partition table 1702 contains the location of each partition in the L2P log pages 1704. The L2P log pages 1704 can have a data structure similar to a data structure of the 8 KB_LPs 804 and have a size that is one-one hundred and twenty fourth the size of the logical-to-physical table 1708.

The L2P partition table 1702 identifies the most-recent version of each partition in the L2P log pages 1704. The L2P partition table 1702 enables the option of deferring or staggering the build of the logical-to-physical table 1708. The L2P Partition table 1702 is used to identify valid partitions when recycling super log blocks, such as any of the super log blocks 704 of FIG. 7.

Since the L2P update log 702 of FIG. 7 can contain more than one copy of the L2P partitions 806 of FIG. 8 in more than one of the super log blocks 704, the most-recent version for each partition can be tracked using the L2P partition table 1702. The L2P partition table 1702 can be used to optimize the process of recycling of the super log blocks used by the L2P log pages 1704. The L2P partition table 1702 is key to initializing the data structure for the logical-to-physical table 1708.

For purposes of illustration, the L2P partition table 1702 for a 300 GB drive would be four hundred and nine thousand and six hundred partitions. Each of the L2P log pages 1704 could store 16 partitions. Selecting a size for the L2P partition table 1702 largely depends on the resources available for initializing the L2P partition table 1702. In another example, a 200 GB drive with four hundred nine thousand five hundred and ninety nine partitions and with each of the partitions having one hundred and twenty eight pages would require 1.6 MB of volatile memory.

For example, a 420 GB drive with a partition size of 2K-bytes and two hundred fifteen thousand and forty partitions, would have an initialization time of five tenths of a second. The 420 GB drive with a partition size of 1K-bytes and four hundred thirty thousand and eighty partitions, would have an initialization time of one second, for example.

The 420 GB drive with a partition size of 512-bytes and eight hundred sixty thousand, one hundred and sixty partitions, would have an initialization time of two seconds, for example. Note the initialization times are inversely proportional to the partition size and are estimations based on the L2P update log 702 having a size that is ten times the size of the logical-to-physical table 1708.

Figure 18:
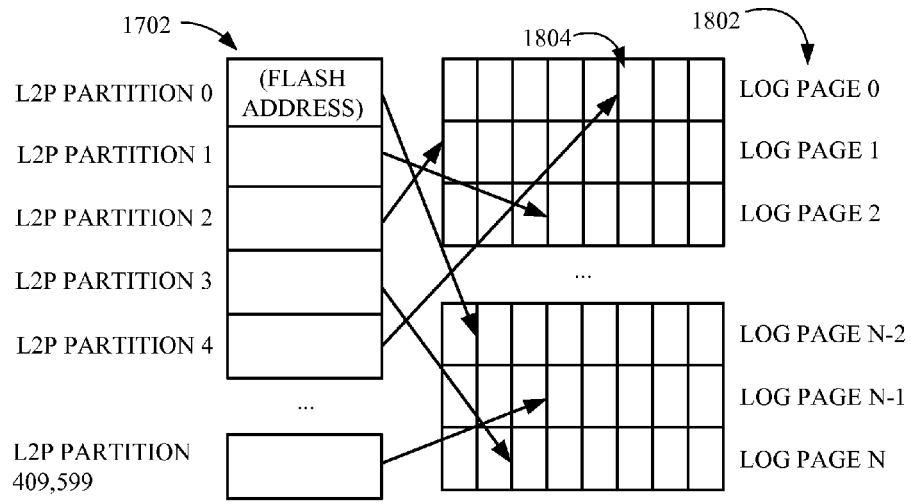
FIG. 18 is an example of the logical-to-physical partition table of FIG. 17 pointing to an address of a flash page of FIG. 2 containing logical-to-physical pieces.

Referring now to FIG. 18, therein is shown an example of the logical-to-physical partition table 1702 of FIG. 17 pointing to an address of a flash page 1802, containing logical-to-physical pieces 1808. The L2P partition table 1702 is shown pointing to flash addresses of the logical-to-physical pieces 1804 in the flash page 1802. The logical-to-physical pieces 1808 can be defined as a portion of the table that contains the actual NAND flash addresses, such as a channel, a chip select, a logical Unit (LUN), an erase block, or a page address.

An increase in size of a solid state drive (SSD) results in an increase in size of the logical-to-physical array, such as the logical-to-physical table 302 of FIG. 3. A 1.2 TB SSD would result in 1.2 GB of DDRAM for the logical-to-physical table 302 and if the 1.2 TB SSD has a maximum volatile memory size of 1 GB, the entire logical-to-physical table 302 would not fit in the RAM.

It has been discovered that the logical-to-physical table 302 pointing to an address of flash page 1802 containing the logical-to-physical pieces 1804 can be used to minimize the required size of the RAM, simplify architecture of a SSD, or reduce interface traffic between the flash page 1802 and the RAM to improve performance of the SSD.

Figure 19:
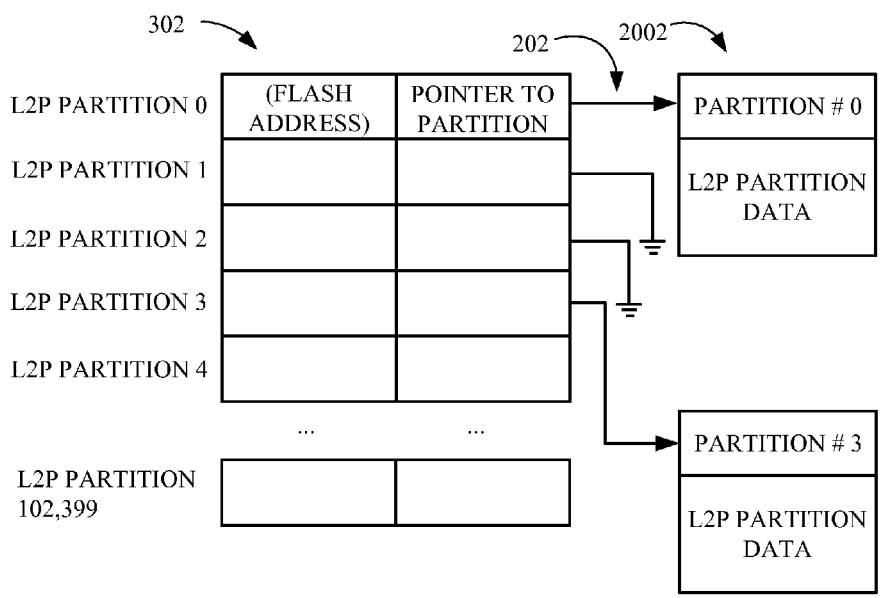
FIG. 19 is shown an example of the logical-to-physical partition table.

Referring now to FIG. 19, therein is shown an example of the logical-to-physical partition table. The logical-to-physical partition table can be a supplemental (or replacement) table which points to the pieces of the L2P that are actually in RAM. The pieces of the L2P table would reside in a pooled area of RAM. At any one time, not all of the pieces of the L2P table are in memory, only a sparse number of pieces. Also, by not having all of the L2P table in memory at one time, the number of NAND flash reads required to start using the table will reduce the amount of start-up initialization time. It also means that only the segments of the L2P table in memory will have to be stored in the event of a power interruptions since the rest of the table already exists in the NAND.

Figure 20:
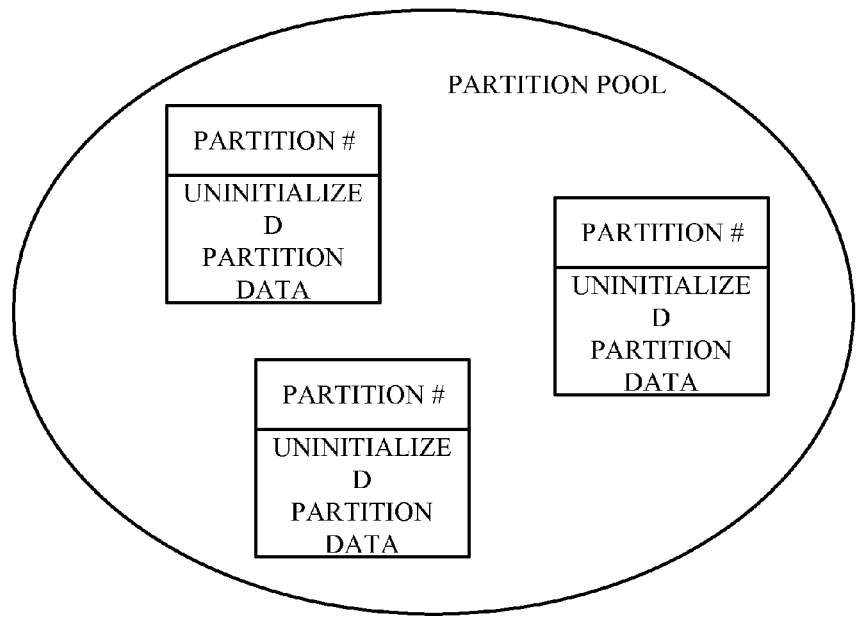
FIG. 20 is an example of a logical-to-physical pool.

Referring now to FIG. 20, therein is shown an example of a logical-to-physical pool. A large area of the volatile memory table 108, of FIG. 1, can be allocated to store a logical-to-physical pool (L2P pool). A L2P piece from the L2P pool can be allocated and linked to the head of a most-recently-used list when reading a L2P partition from NAND. Each time the L2P piece is accessed, the L2P piece can be re-linked to the head of the MRU list. The oldest entries in the MRU list can be reclaimed to the L2P pool.

Size of the L2P pool can range from about one quarter of the size of the L2P table. For example, the size of a L2P table for a 480 GB drive would be over 480 MB. Memory size can be limited with drives having a capacity over 480 GB. Also, the larger the L2P pool size, the higher probability of identifying data in RAM as the drive remains powered on. Data structures can be manipulated in the volatile memory table 108 faster than manipulating the data structures in NAND. This also effective reduces the number of NAND operations.

Figure 21:
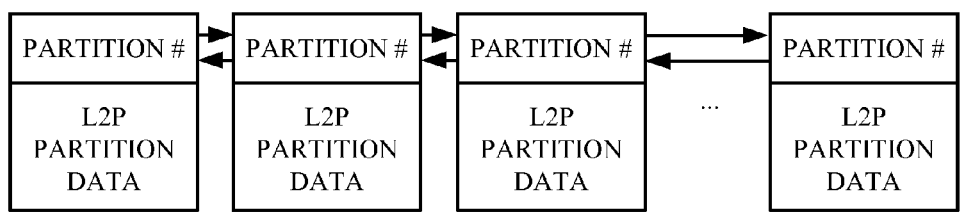
FIG. 21 is an example of a Most Recently Used (MRU) partition list.

Referring now to FIG. 21, therein is shown an example of a Most Recently Used (MRU) partition list. A partition saved in NAND and read into a L2P Partition data object can be linked into Most Recently Used (MRU) list. Subsequently, every time the partition is accessed, the partition is re-linked to the front of the MRU list resulting in the most recently used entries near the front of the MRU list and the oldest entries at the rear.

The oldest entries can be removed when a pool is empty and a new entry is allocated. The MRU list can be doubly-linked to facilitate removal from any point in the list. Removal of a partition from the MRU list can result in the corresponding partition pointer in the partition table set to NULL to indicate that the L2P partition is no longer in RAM.

Figure 22:
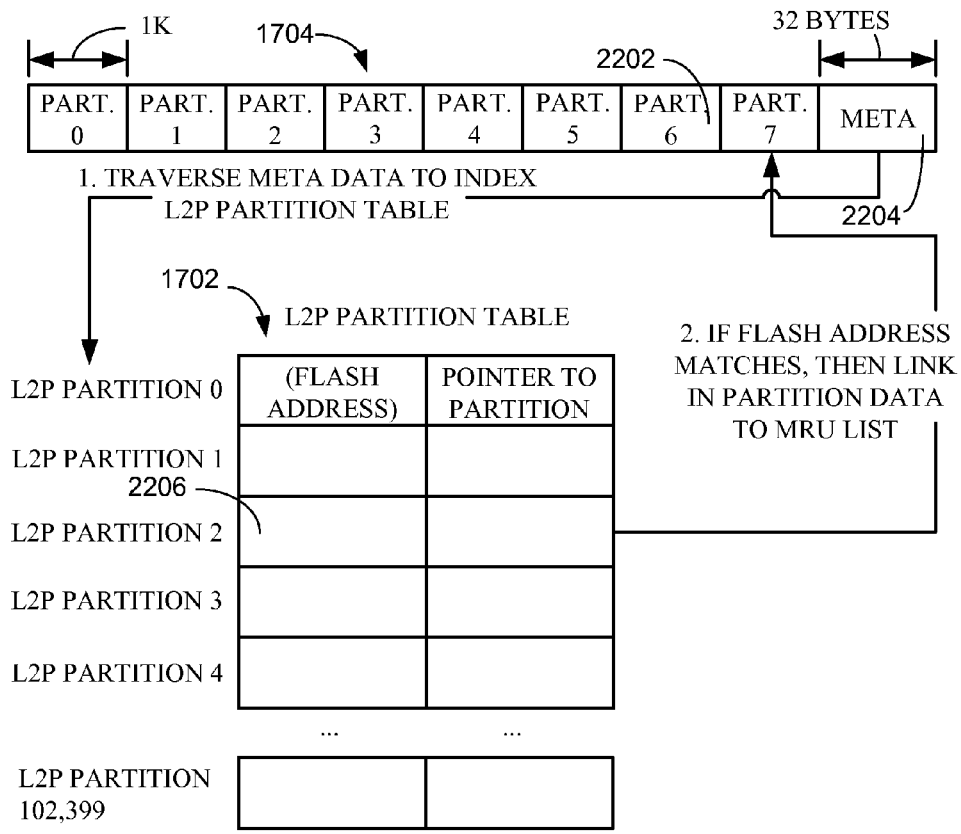
FIG. 22 is an example of reading multiple partitions within a logical-to-physical partition table.

Referring now to FIG. 22, therein is shown an example of reading multiple partitions within a logical-to-physical partition table 1702. As described above, each of the L2P log pages 1704 holds 8 or 16 L2P partitions 2202. When a partition is identified that needs to be read from NAND, the log pages could be populated with the remaining 7 or 15 other partitions that reside in that single NAND flash page.

The metadata 2204 can be traversed so that each of the L2P log pages 1704 can be used to determine if a Partition Table Entry 2206 points to the flash page just read. If the flash page just read is in the log page, then it is still the most up-to-date partition, so it can be linked to the most recently used (MRU) list.

It has been discovered that the traversal of the metadata 2204 to the partition table entry 2206 will prevent additional reads of the flash page to access another instance of the Partition 2202 in the same page.

It has been further discovered that the traversal of the metadata 2204 can be efficiently implemented using the linked-list to read each 1K data into the partition table entry 2206 from a pool of updated or unused instances of the partition table entry 2206.

It has been discovered that the traversal of the metadata 2204 removes the need to back-fill the full L2P table. An estimated time for filling 480 MB of DDRAM using a DMA would take at least 150 milliseconds. The traversal of the metadata 2204 also removes need to read the entire L2P table, which is would require reading 480 MB from NAND flash and is estimated to take at least 600 milliseconds.

It has been discovered that the initialization time can be reduce by the storage control system 100 of FIG. 1, providing scalability to larger SSDs, without accessing unused areas of L2P table 1702, and utilizing a saving in the volatile memory table 108, of FIG. 1, for front-end cache thus increasing the overall performance of the SSDs.

Figure 23:
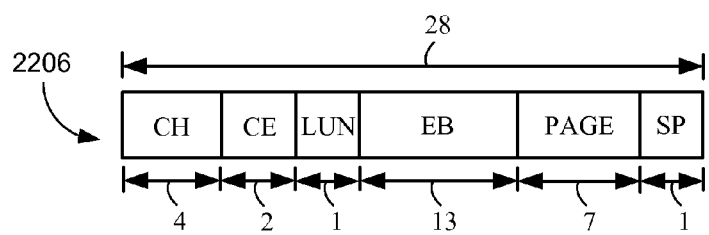
FIG. 23 is an example of a 28-bit logical-to-physical table entry.

Referring now to FIG. 23, therein is shown an example of a 28-bit logical-to-physical table entry 2206 of FIG. 22. The L2P table entry 2206 described above uses a full 32-bits per L2P table entry 2206 to describe the address of the physical flash memory location. However, the physical flash address needed doesn't actually use all 32-bits. Instead, it uses only 28 bits, as shown in FIG. 23.

The components of FIG. 23 can be as follows—CH: Channel, 4 bits, 0 through 15; CE: Chip Enable, 2 bits, 0 through 3; LUN: Logical Unit, 1 bit, 0 or 1; EB: Erase Block, 13 bits, 0 through 4095; Page: Page number: 7 bits, 0 through 127; SP: Subpage, 1 bit, 0 or 1. The LUN can be a die or portions of a die. The L2P IDs 308 of FIG. 3 can include a portion of some or all of the components of FIG. 23.

Figure 24:
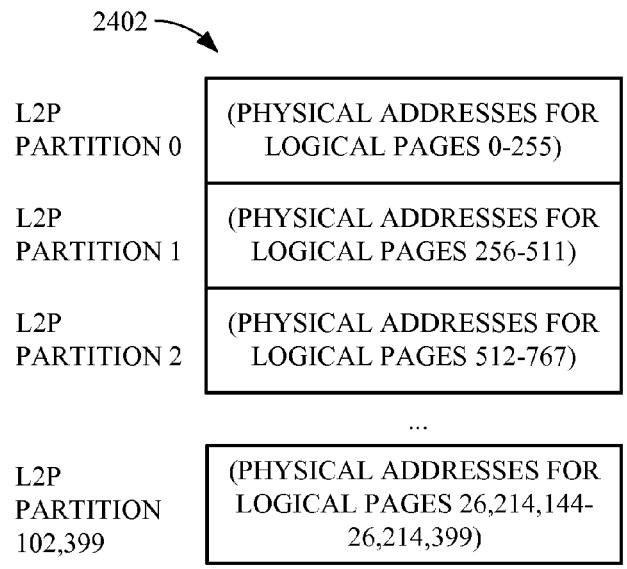
FIG. 24 is an example of a logical-to-physical table.
Figure 25:
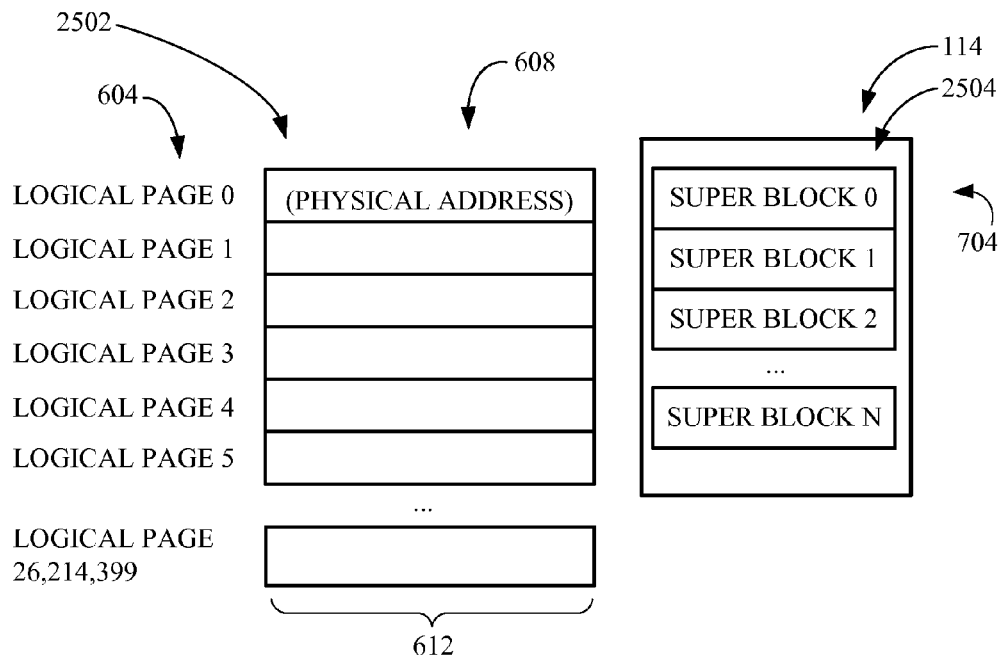
FIG. 25 is a detailed example of a logical-to-physical table and a logical-to-physical update log.

Referring now to FIG. 24, therein is shown an example of a logical-to-physical table 2402. Shown is the logical-to-physical table 2402, similar to the L2P table 302 of FIG. 3, referred to as a 100 GB logical-to-physical table or 100 GB L2P table 2402. In this example, the 100 GB L2P table 2402 can be used for a 100 GB drive and contains two hundred and fifty six physical addresses for each partition.

The changes in the 100 GB L2P table 2402 can be persistently captured and stored in non-volatile memory using logs in a manner similar to the L2P update log 702 of FIG. 7, the super log blocks 704 of FIG. 7, L2P partition table 1702 of FIG. 17, or the L2P table 302 of FIG. 3. The logs can be used to rebuild the 100 GB L2P table 2402, structures, or data in volatile memory during a drive initialization, after a power cycle, or to restore any of the logs at any time Referring now to FIG. 27, therein is shown an detailed example of a logical-to-physical table 2502 and a logical-to-physical update log 2504. In this example, the logical-to-physical table 2502 is, for example, a 100 GB drive. Each of the L2P partition offsets 604 identifies a group of the LP entries 306 of FIG. 3. Each of the physical locations of entries in the L2P table 2502 can contain multiple logical-to-physical-page IDs referred to as the L2P page IDs 608. Each of the L2P page IDs 608 have a physical identifier length, referred to as a PIL 612 in a manner similar to the PIL 312 of FIG. 3.

L2P update log 2504, is an example of a data structure in the NVM space 114. The L2P update log 2504 must be updated in a persistent manner to reflect any updates to the VM table 108 of FIG. 1. Since the VM table 108 is modified whenever the location of a logical flash page is changed, updates to the NVM space 114 must be kept with modifications to the VM table 108 to enable the VM table 108 to be rebuilt across power cycles using the L2P update log 2504 in the NVM space 114.

Figure 26:
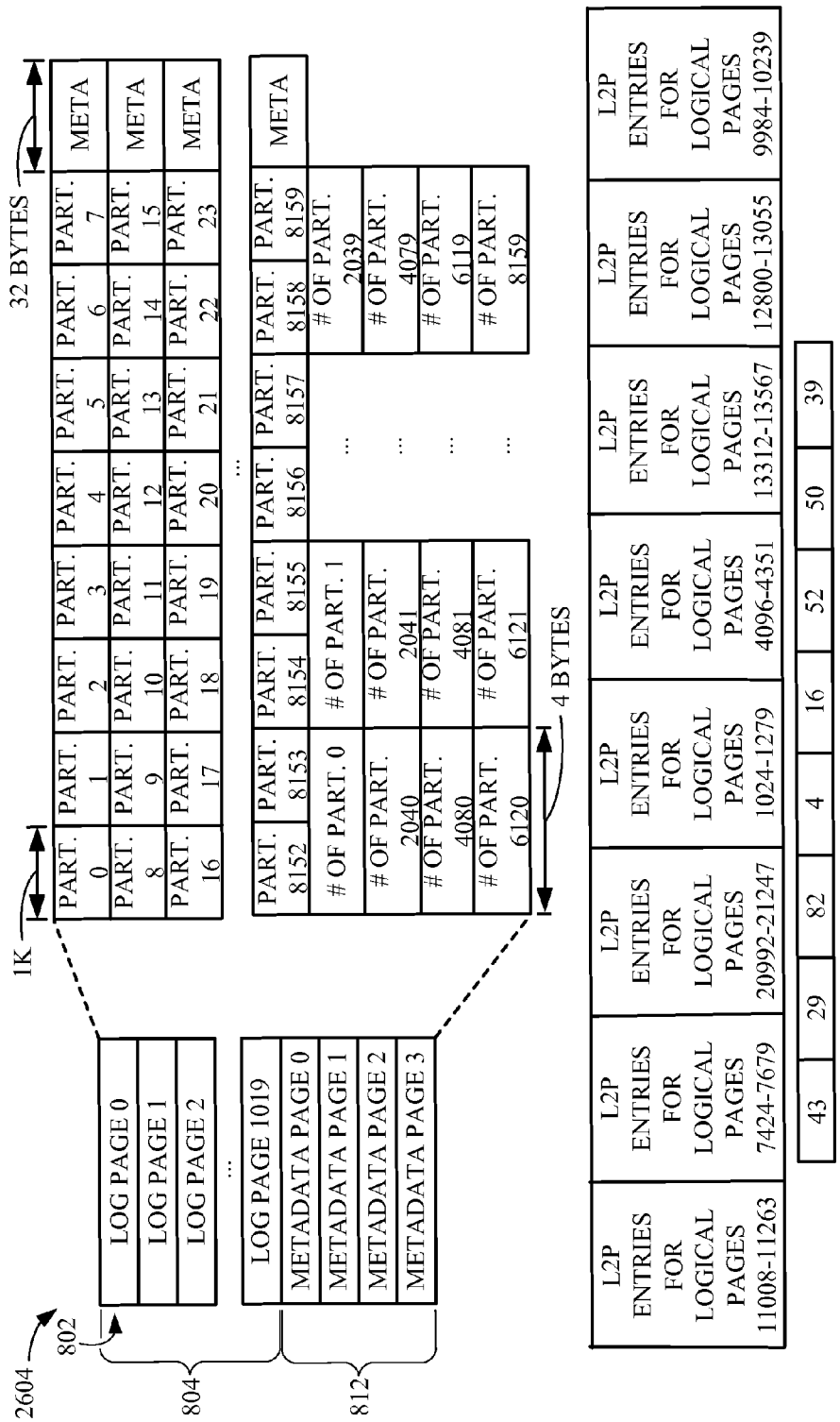
FIG. 26 is another example of a super log block.

Referring now to FIG. 26, therein is shown another example of a super log block 2604. The super log block 2604 can have metadata of 32 bytes. The super log blocks 2604 of a L2P update log 114 of FIG. 1 can be scattered throughout the drive and there is no restriction on the use of the super blocks. The super log blocks 704, when in chronological order, form a sequential log. This sequential log is read only during drive initializations.

Figure 27:
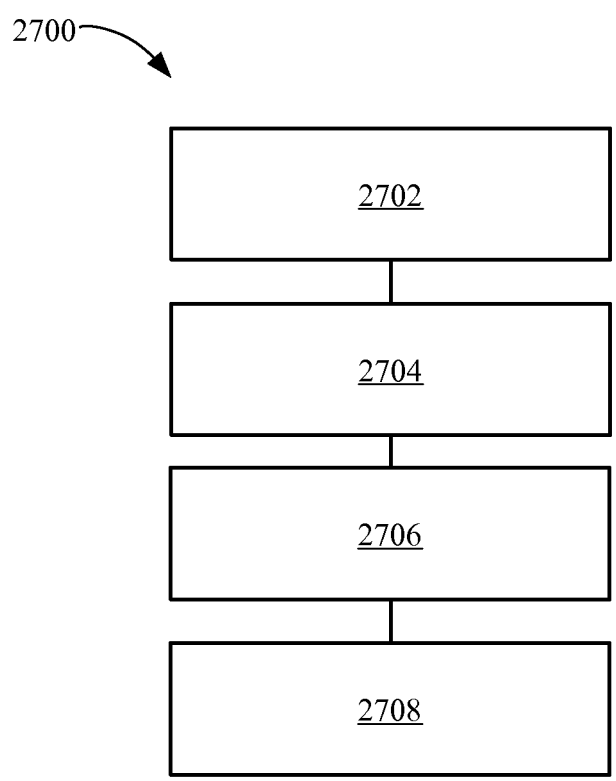
FIG. 27 is a flow chart of a method of operation of the storage control system in a further embodiment of the present invention.

Referring now to FIG. 27, therein is shown a flow chart of a method 2700 of operation of the storage control system 100 in a further embodiment of the present invention. The method 2700 includes: providing a memory controller in a block 2702; accessing a volatile memory table by the memory controller in a block 2704; writing a non-volatile semiconductor memory for persisting changes in the volatile memory table in a block 2706; and restoring a logical-to-physical table in the volatile memory table, after a power cycle, by restoring a random access memory with a logical-to-physical partition from a most recently used list in a block 2708.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A storage control system comprising:
   a memory controller;
   a volatile memory storing, prior to a power cycle, a logical-to-physical translation table maintained by the memory controller, wherein the translation table includes a set of partitions ordered in accordance with most recent use of the partitions, each partition including physical address information for a plurality of logical addresses, wherein the memory controller updates respective partitions of the logical-to-physical translation table in volatile memory; and
   a non-volatile semiconductor memory storing an update log written to by the memory controller, wherein the update log includes log records, each log record corresponding to an update by the memory controller to a respective partition of the logical-to-physical translation table in volatile memory;
   wherein the volatile memory stores, after a power cycle, a restored portion of the logical-to-physical translation table stored in the volatile memory prior to the power cycle, wherein the restored portion of the logical-to-physical translation table is restored after the power cycle by traversing the log records in the update log in the non-volatile semiconductor memory in reverse chronological order to identify and restore a most recent version of each of a plurality of partitions of the logical-to-physical translation table.

2. The system of claim 1 wherein the memory controller includes a local buffer for pending memory operations.

3. A method of operation of a storage control system, performed by a memory controller in a storage system having volatile memory and non-volatile memory, the method comprising:
   maintaining in volatile memory a logical-to-physical translation table, the translation table including a set of partitions ordered in accordance with most recent use of the partitions, each partition including physical address information for a plurality of logical addresses;
   said maintaining including updating respective partitions of the logical-to-physical translation table in volatile memory;
   writing to an update log in non-volatile semiconductor memory a log record for each updated partition of the logical-to-physical translation table in volatile memory;
   after a power cycle, restoring to the volatile memory at least a portion of the logical-to-physical translation table stored in the volatile memory prior to the power cycle by traversing the log records in the update log in the non-volatile semiconductor memory in reverse chronological order to identify and restore a most recent version of each of a plurality of partitions of the logical-to-physical translation table.

4. The method of claim 3, wherein each log record in the update log contains updated translation information for a respective partition of the logical-to-physical partition table; and said traversing includes skipping a first log record in the update log when a more recent log record in the update log contains translation information for a same partition as the first log record.

5. The method of claim 3, wherein the logical-to-physical translation table in volatile memory comprises a doubly linked list of partitions ordered in accordance with most recent use.

6. The method of claim 3, wherein the non-volatile semiconductor memory comprises NAND flash memory.

7. The method of claim 3 wherein the memory controller includes a local buffer for pending memory operations.

8. The system of claim 1 wherein each log record in the update log contains updated translation information for a respective partition of the logical-to-physical partition table; and
said traversing includes skipping a first log record in the update log when a more recent log record in the update log contains translation information for a same partition as the first log record.

9. The system of claim 1, wherein the logical-to-physical translation table in volatile memory comprises a doubly linked list of partitions ordered in accordance with most recent use.

10. The system of claim 1, wherein the non-volatile semiconductor memory comprises NAND flash memory.

* * * * *